US008582728B2

(12) United States Patent
Ross

(10) Patent No.: US 8,582,728 B2
(45) Date of Patent: Nov. 12, 2013

(54) WEB-TYPE AUDIO INFORMATION SYSTEM USING PHONE COMMUNICATION LINES (AUDIO NET PAGES)

(76) Inventor: Freddie B. Ross, Katy, TX (US)

( * ) Notice: Subject to any disclaimer, the term of this patent is extended or adjusted under 35 U.S.C. 154(b) by 1083 days.

(21) Appl. No.: 12/387,518

(22) Filed: May 4, 2009

(65) Prior Publication Data

US 2009/0279678 A1    Nov. 12, 2009

Related U.S. Application Data

(60) Provisional application No. 61/126,525, filed on May 5, 2008.

(51) Int. Cl.
*H04M 11/00* (2006.01)
(52) U.S. Cl.
USPC .............. 379/88.17; 379/88.13; 379/93.01
(58) Field of Classification Search
USPC .......... 379/88.13, 93.01, 93.12, 93.13, 93.23, 379/93.25, 88.17
See application file for complete search history.

(56) References Cited

U.S. PATENT DOCUMENTS

| | | | |
|---|---|---|---|
| 4,757,267 A | 7/1988 | Riskin | |
| 4,899,369 A | 2/1990 | Kondziela | |
| 5,351,276 A * | 9/1994 | Doll et al. | 379/88.17 |
| 5,390,237 A * | 2/1995 | Hoffman et al. | 379/88.23 |
| 5,448,625 A | 9/1995 | Lederman | |
| 5,539,808 A | 7/1996 | Inniss et al. | |
| 5,661,787 A * | 8/1997 | Pocock | 379/101.01 |
| 5,799,063 A * | 8/1998 | Krane | 379/88.17 |
| 5,884,262 A * | 3/1999 | Wise et al. | 704/270.1 |
| 5,907,320 A | 5/1999 | Beesley et al. | |
| 5,909,670 A | 6/1999 | Trader et al. | |
| 5,956,482 A * | 9/1999 | Agraharam et al. | 709/203 |
| 6,240,448 B1 * | 5/2001 | Imielinski et al. | 709/218 |
| 6,278,770 B1 | 8/2001 | Makihata | |
| 6,314,577 B1 | 11/2001 | Pocock | |
| 6,400,806 B1 * | 6/2002 | Uppaluru | 379/88.02 |
| 6,445,694 B1 | 9/2002 | Swartz | |
| 6,493,434 B1 * | 12/2002 | Desmond et al. | 379/88.17 |
| 6,529,584 B1 | 3/2003 | Ravago et al. | |
| 6,529,586 B1 * | 3/2003 | Elvins et al. | 379/88.13 |
| 6,546,005 B1 | 4/2003 | Berkley et al. | |
| 6,614,896 B1 | 9/2003 | Rao | |
| 6,687,341 B1 * | 2/2004 | Koch et al. | 379/88.17 |
| 6,807,257 B1 | 10/2004 | Kurganov | |
| 6,856,673 B1 | 2/2005 | Banks et al. | |
| 6,873,877 B1 | 3/2005 | Tobias et al. | |
| 6,925,168 B1 | 8/2005 | Launders et al. | |
| 6,956,932 B2 | 10/2005 | Ciavolino | |
| 7,187,761 B2 | 3/2007 | Bookstaff | |
| 7,548,875 B2 * | 6/2009 | Mikkelsen et al. | 705/26.8 |
| 2001/0048676 A1 | 12/2001 | Jimenez et al. | |
| 2002/0110237 A1* | 8/2002 | Krishnan | 379/419 |
| 2002/0164000 A1* | 11/2002 | Cohen et al. | 379/88.17 |
| 2003/0053444 A1 | 3/2003 | Swartz | |
| 2005/0060241 A1* | 3/2005 | Williams | 705/27 |
| 2005/0276399 A1 | 12/2005 | Thompson | |
| 2007/0094073 A1 | 4/2007 | Dhawan et al. | |

(Continued)

*Primary Examiner* — Christopher M Brandt
(74) *Attorney, Agent, or Firm* — Sue Z. Shaper

(57) ABSTRACT

A web-type audio information system using phone communication lines including a computer based host accessible to phones, supporting multiple indexed stored audio information segments, wherein the content of the segments are substantially selected and supplied by multiple independent subscribers, and the host supports an interactive directory system providing for connecting a phone line with an audio segment in accordance with supplied segment identification.

30 Claims, 21 Drawing Sheets

(56) References Cited

U.S. PATENT DOCUMENTS

| | | |
|---|---|---|
| 2007/0107008 A1 | 5/2007 | Dybus |
| 2007/0242814 A1 | 10/2007 | Gober |
| 2007/0286363 A1 | 12/2007 | Burg et al. |
| 2009/0214006 A1* | 8/2009 | Campbell et al. .......... 379/88.13 |

* cited by examiner

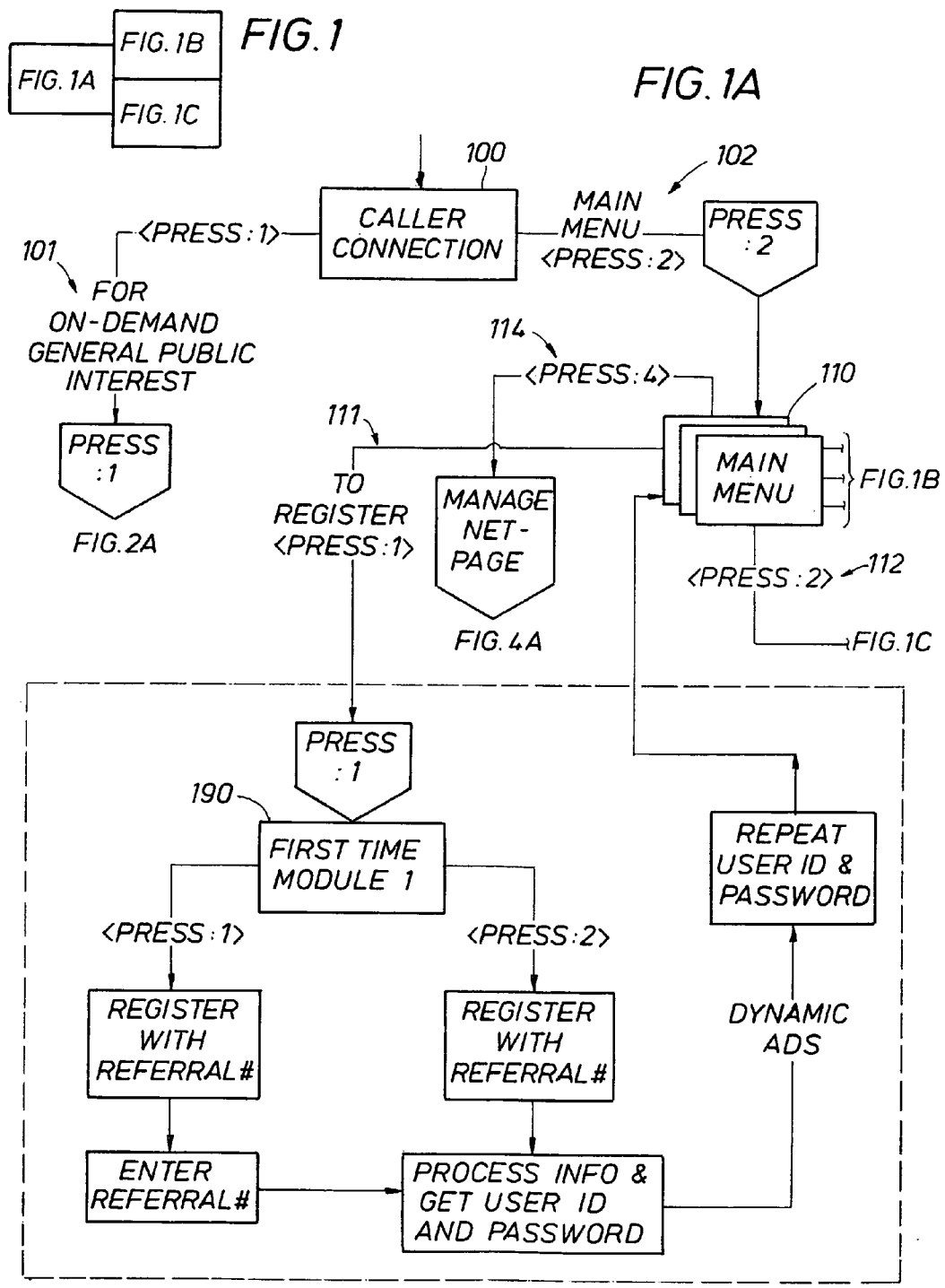

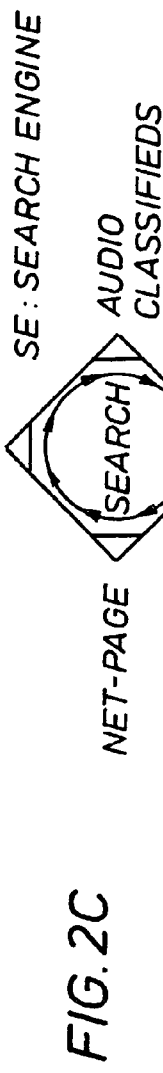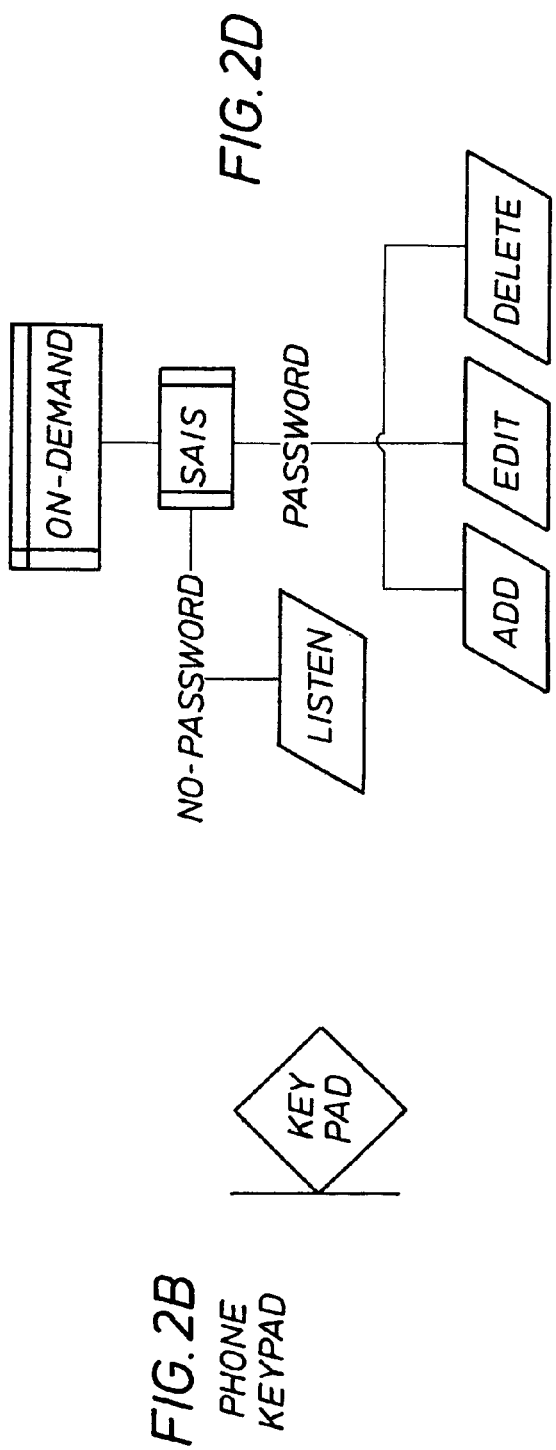

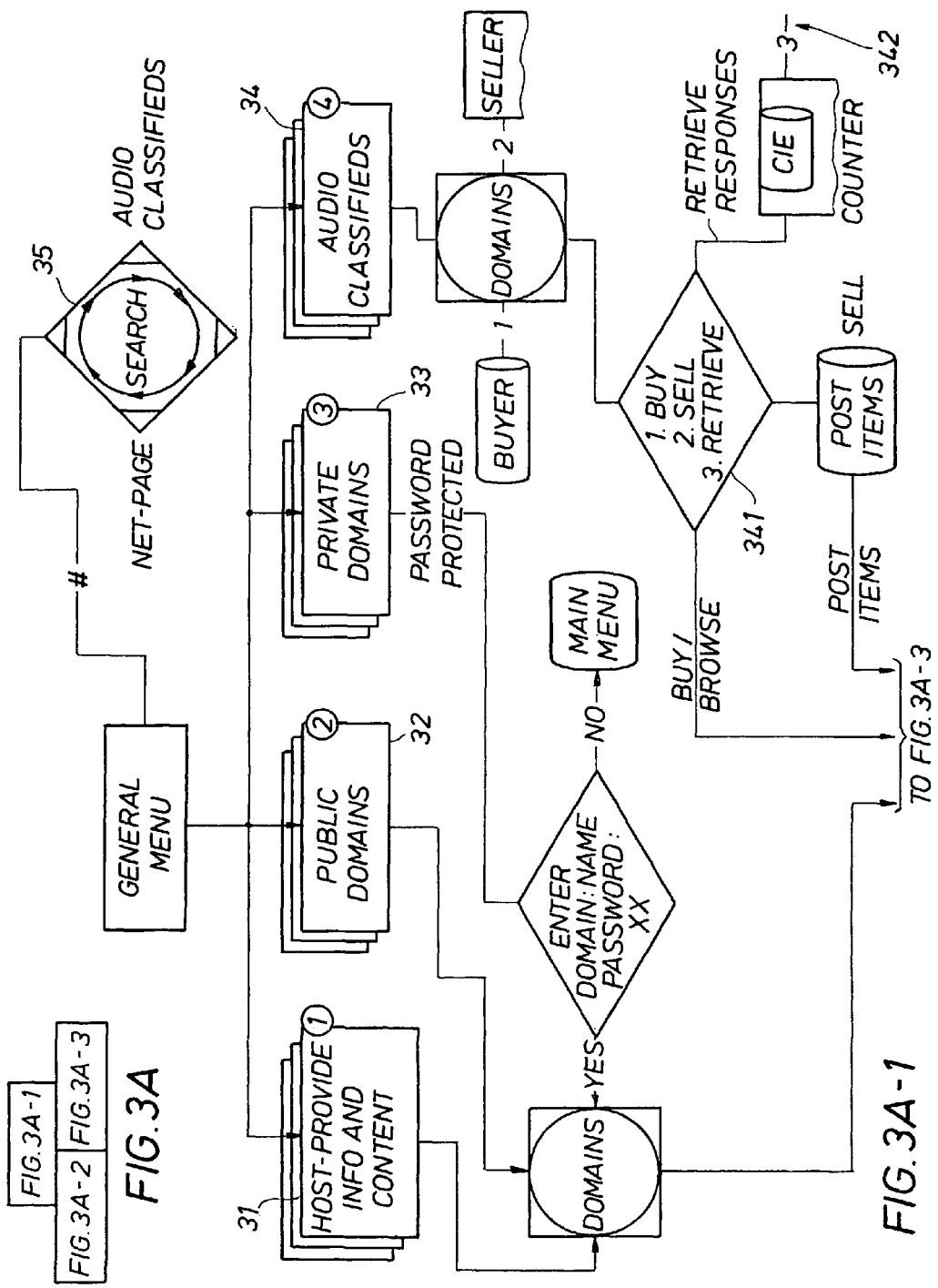

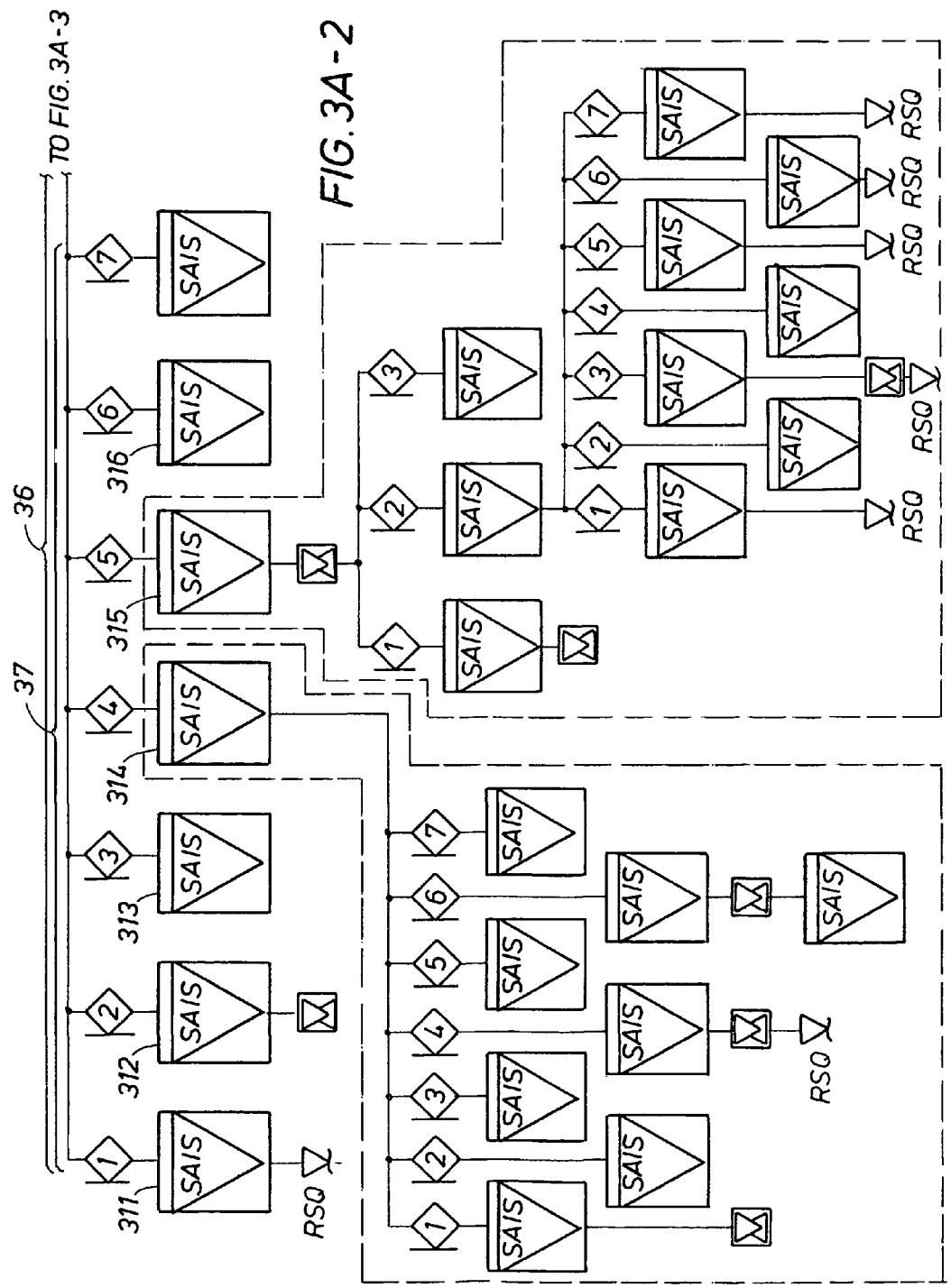

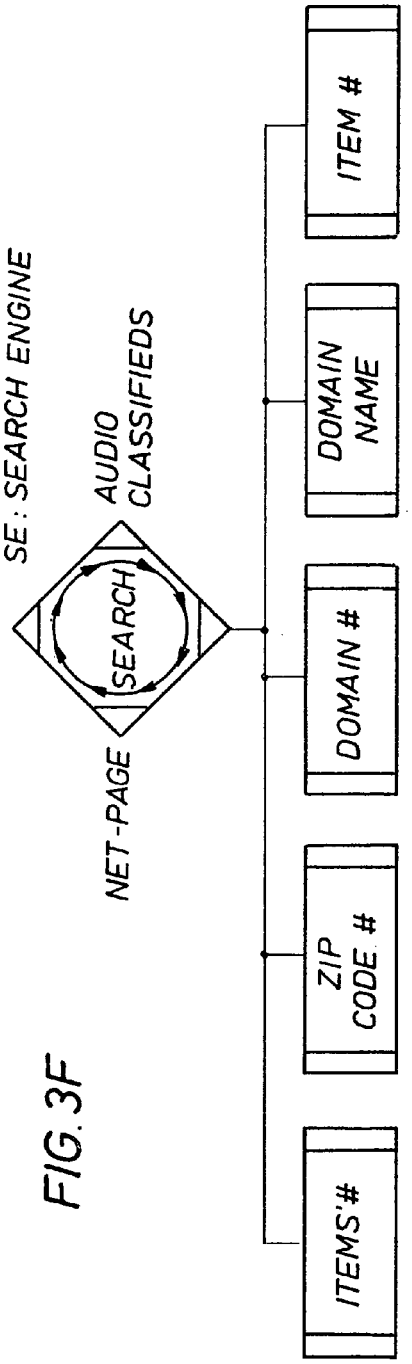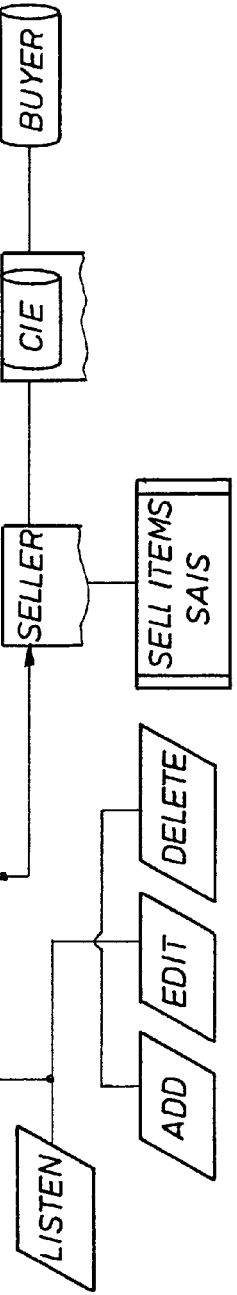

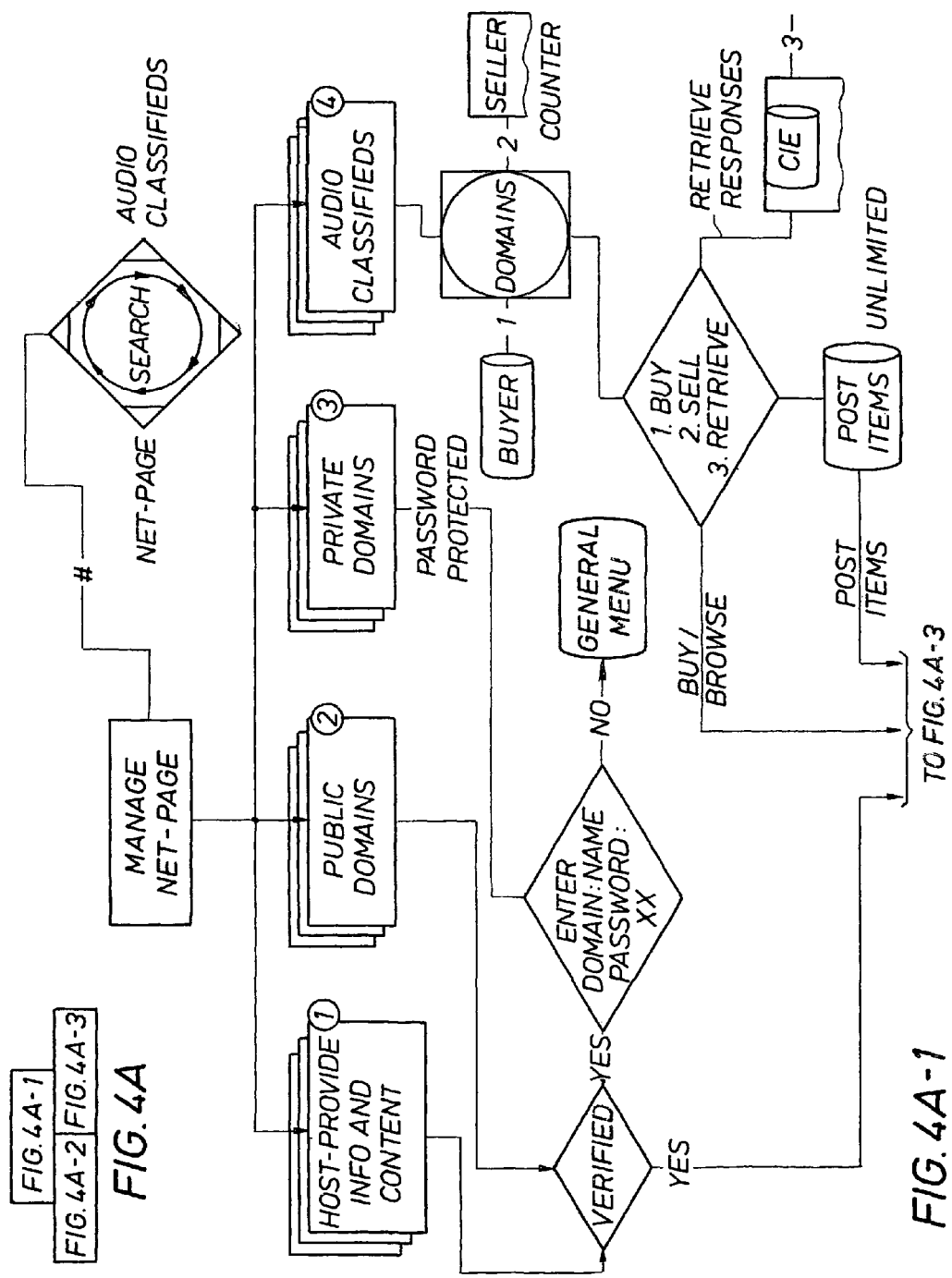

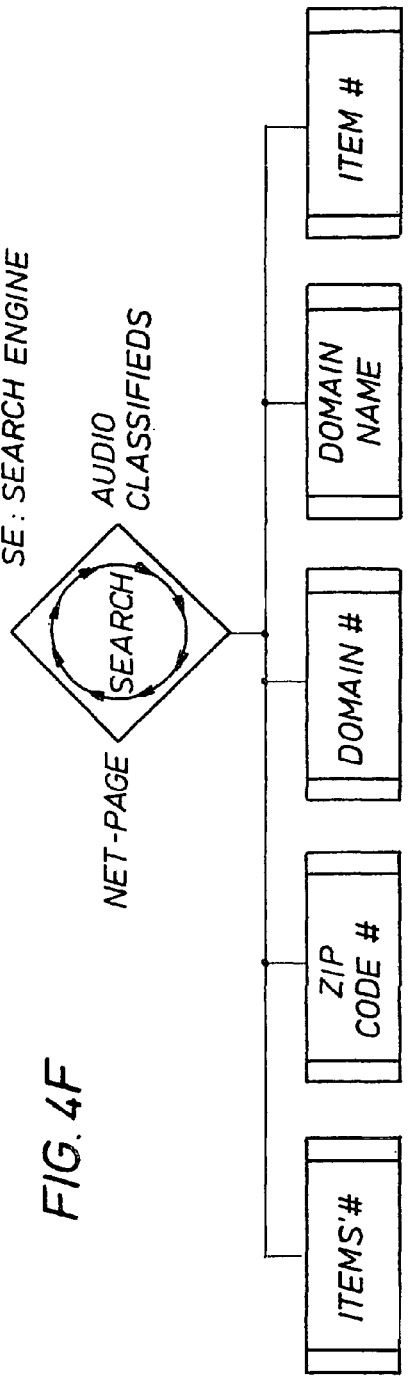
FIG. 4F
FIG. 4G
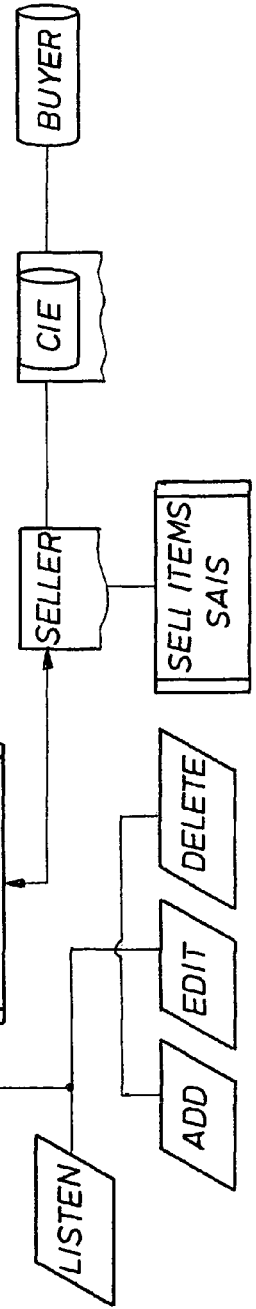
FIG. 4H

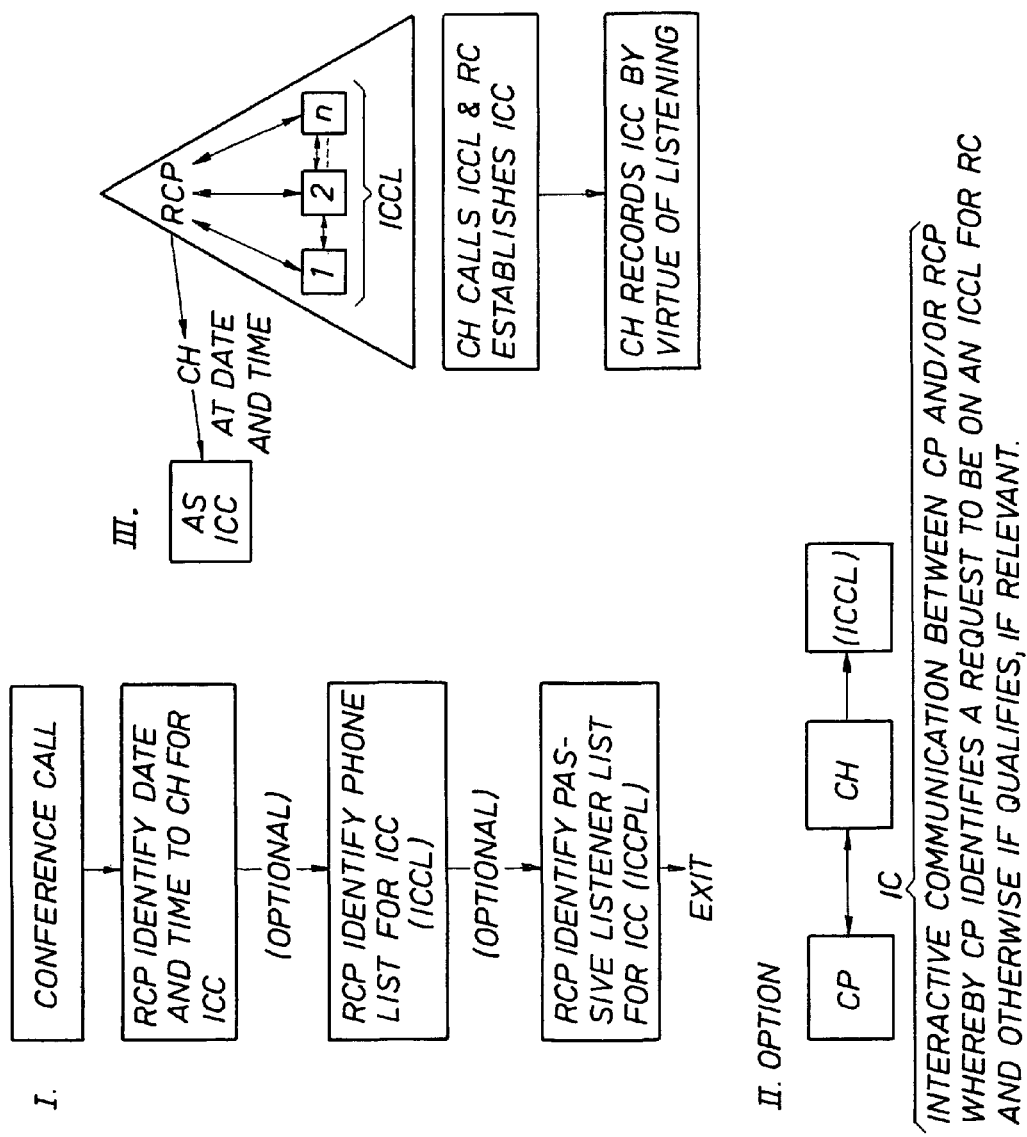

IV.

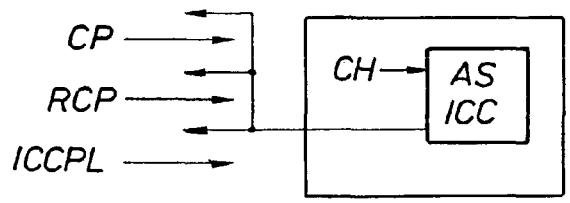

(CH PLAYS AS ICC TO CP AND/OR RCP AND/OR ICCPL)

V.

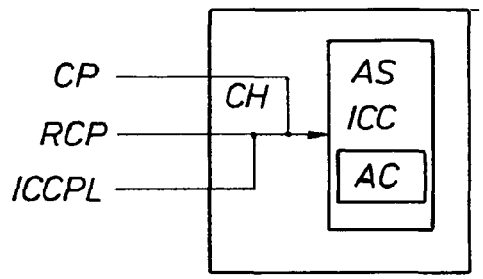

(CALLER ADDS AUDIO CONTENT AC)

FIG. 5B

IDENTIFY IS BY INTERACTIVE TELEPHONY COMMUNICATION OVER PCL USING PHONE AND/OR KEYPAD.

COMPUTERIZED HOST CH PROVIDES SELECTABLE OPTIONS AND/OR PROMPTS TO A CALLER PHONE.

CH - COMPUTERIZED HOST
CP - CALLER PHONE  CP INCLUDES RCP
RCP - REGISTERED (ID AND PASSWORD) CALLER ON PHONE
ICC - INTERACTIVE CONFERENCE CALL

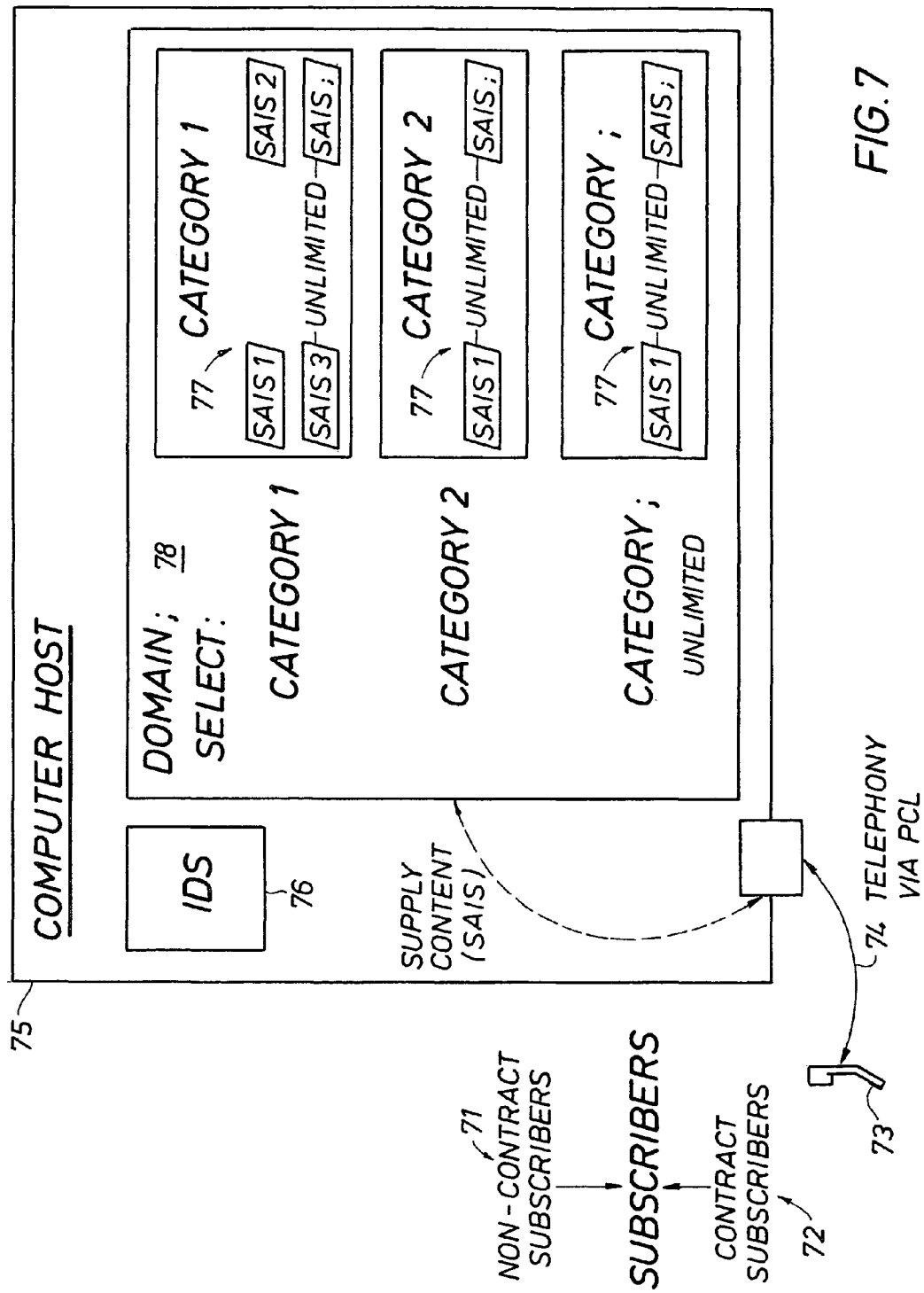

WEB-TYPE AUDIO INFORMATION SYSTEM USING PHONE COMMUNICATION LINES (AUDIO NET PAGES)

CROSS REFERENCE TO RELATED APPLICATIONS

This application is related to and claims priority to Provisional Application Ser. No. 61/126,525 filed May 5, 2008 entitled Audio Based Information System Using Phone Communication Lines (Audio Net Pages).

FIELD OF THE INVENTION

The invention relates to information systems, and more particularly, to a web-type audio information system using public phone communication lines independently of Internet Service Providers (ISP's).

BACKGROUND OF THE INVENTION

The World Wide Web ("WWW") has generated a significant following resulting from the ability of individuals to access, via ISP's, a wide spectrum of information made available over the internet by independent and unrelated content providers. The internet is provided by governmental interests at no cost. (The WWW consists of independent domains, or websites, containing web pages comprised of hypertext objects which can be retrieved by users having computer access to the internet.) A November-December 2007 survey conducted by the Pew Institute indicates that 74% of Americans use the internet. More than 160 million web sites exist as of March 2007, according to the Network Web Server Survey Access to the wealth of information on the WWW is limited, however, to those with access to a computer, or PDA or the like, at the time. There is yet a need to make a spectrum of independently managed and supplied information also available to people without access to a computer or the like, at least at the moment, but with access to a phone. There is a need to provide such information to people who prefer access by phone. This system preferably entails, basically, securing audio information from a variety of individuals, e.g. entrepreneurs, businesses or other sources, indexing the information and making the information available over phone lines.

The instant invention addresses the problem of providing an audio-based information utility similar to the internet which is accessible by users having access to telephone but having no computer access to the internet. The instant invention solves the problem by providing an audio based information system comprising a computer based host accessible by telephony connection, supporting multiple indexed recorded audio information segments supplied by multiple independent subscribers. Further, the problem of managing audio content and customized navigation from multiple independent subscribers is solved by a system comprising a computer based host accessible by telephony connection allowing subscribers to supply audio content for that subscriber's audio domain, including by telephony instruction.

The instant invention began with the concept of audio networking. The theory was to deliver information using the telephone as a distributor. What was first needed was a telephone system that would pull from a database. An initial design feature of applicant's system, however, was not to require a host to secure the information from individual suppliers and input the information into a telephone system, nor to simply link callers to the phone numbers of suppliers of information. Rather, a preferred design feature of the instant invention was to allow the information content suppliers to have control over their information, inputting themselves to an audio network maintained by a host computer, and subsequently editing, adding, modifying or deleting the information stored therein.

In original concept the project envisioned further optional modules:

Outgoing calling

Ask and Answer Questions—designed so that individuals could ask questions and get answers from other individuals New Members—useable with a base platform.

Calendar—a calendar platform created to call individual extensions as they had upcoming events.

Possibly access the web and read directly from a website.

The instant technology is designed to offer extensive audio information to anyone with a telephone and access to the network through an 1-800 number or the like. The technology would further provide the ability to modify or change available information by the information provider itself, referred to as a subscriber. The subscribers, plus advertisers, would support the system financially.

Features of the invention could optionally include:

Ask and Answer Questions to retrieve and receive information;

Address Book;

Allowing existing World Wide Web customers to subscribe and operate on the platform;

Search Engine—to work only on proprietary platform;

Conference Calling;

Off-line advertisement—a caller will hear an advertisement based on the advertisement entry point. When an advertisement is purchased, four forms of advertisement entry point would be offered:

a. randomly picked advertisement;

b. a caller-net advertisement which only content providers of the system would hear, such as advertisements offering Caller Net designs or promoting co-sponsors of the system;

c. Tags—which is a location within the network;

d. based on a criteria or a subject of the advertisement only to play based on a caller criteria.

A Net-Page feature would be a reserved space on a host server for registered users (who could or could not be subscribers), a host-supplied domain that can be located or reached by navigation, with a telephone keypad and/or via an interactive voice network. The "Net-Page" itself could include a series of links that are made available by audio. The Net Page feature would be similar in structure to a website, so that it could be thought of as a homepage with links to subtopic pages. Instead of clicking on a website link with a mouse to go to a subtopic page, a listener could press one of the numbers on a telephone key pad, for instance, to go to a subtopic page. One key difference would be that while a website is visual, a Net-Page is aural.

A Real-Time Net feature, as a type of Net-Page,. could potentially provide a business's customers with telephone access to details of the business, on demand, 24 hours a day, 7 days a week. Customers would not need a television, radio or computer to learn about the business, nor need to know the business phone number. Customers could retrieve business information when they needed it by dialing into the host computer, navigating to the particular Real-Time Net domain or page and listening to prerecorded messages by streaming audio. A business could translate an entire website to a voice Net-Page presented by audio. Alternately, a business could create a unique audio Net-Page presented by streaming audio to announce weekly sales, events, location, hours of operation, etc. A business could further record a radio or television ad onto a link. The business owner determines the content of the Net-Page and changes the content as often as desired. The service would preferably be free to customers.

SUMMARY OF THE INVENTION

The present invention comprises a system and method for providing access to audio based information supplied and controlled by multiple independent subscribers, accessible by telephone.

In one embodiment an audio based information system is provided using a phone communication line (PCL.) The system includes a computer based host accessible to phones for telephony through a phone communication line connection. The host supports multiple indexed stored information segments (SAIS). The content of the segments is substantially selected and supplied by multiple independent subscribers. A host supported interactive directory system (IDS) is provided, the directory system providing for connecting a phone line connection with an audio segment in accordance with segment identification supplied over the phone line connection. A method is provided for an audio based information system, including providing a computer based host accessible to phones through a telephony phone communication line connection, supporting multiple indexed stored audio information segments on the host, wherein segment content is substantially selected and supplied by multiple independent subscribers; and supporting an interactive directory system that provides for connecting a phone line connection with an audio segment in accordance with segment identification supplied over the phone line connection.

The invention also provides a method for managing, by a host computer, audio content as supplied by multiple independent subscribers. The method includes providing a computer based host accessible to phones by a telephony PC connection. The method includes enabling subscribers to supply audio content for stored segments via said PCL connection.

BRIEF DESCRIPTION OF THE DRAWINGS

A better understanding of the present invention can be obtained when the following detailed description of preferred embodiments are considered in conjunction with the following schematic drawings, in which:

FIG. 5 is an application flow chart of an embodiment of an aspect of the present invention illustrating the conference call feature of the present invention.

FIG. 7 is a functional block diagram for a preferred embodiment of the system illustrating subscriber access to supply and manage audio content.

The drawings are primarily illustrative. It would be understood that structure may have been simplified and details omitted in order to convey certain aspects of the invention.

DETAILED DESCRIPTION OF THE PREFERRED EMBODIMENTS

Figure 6:
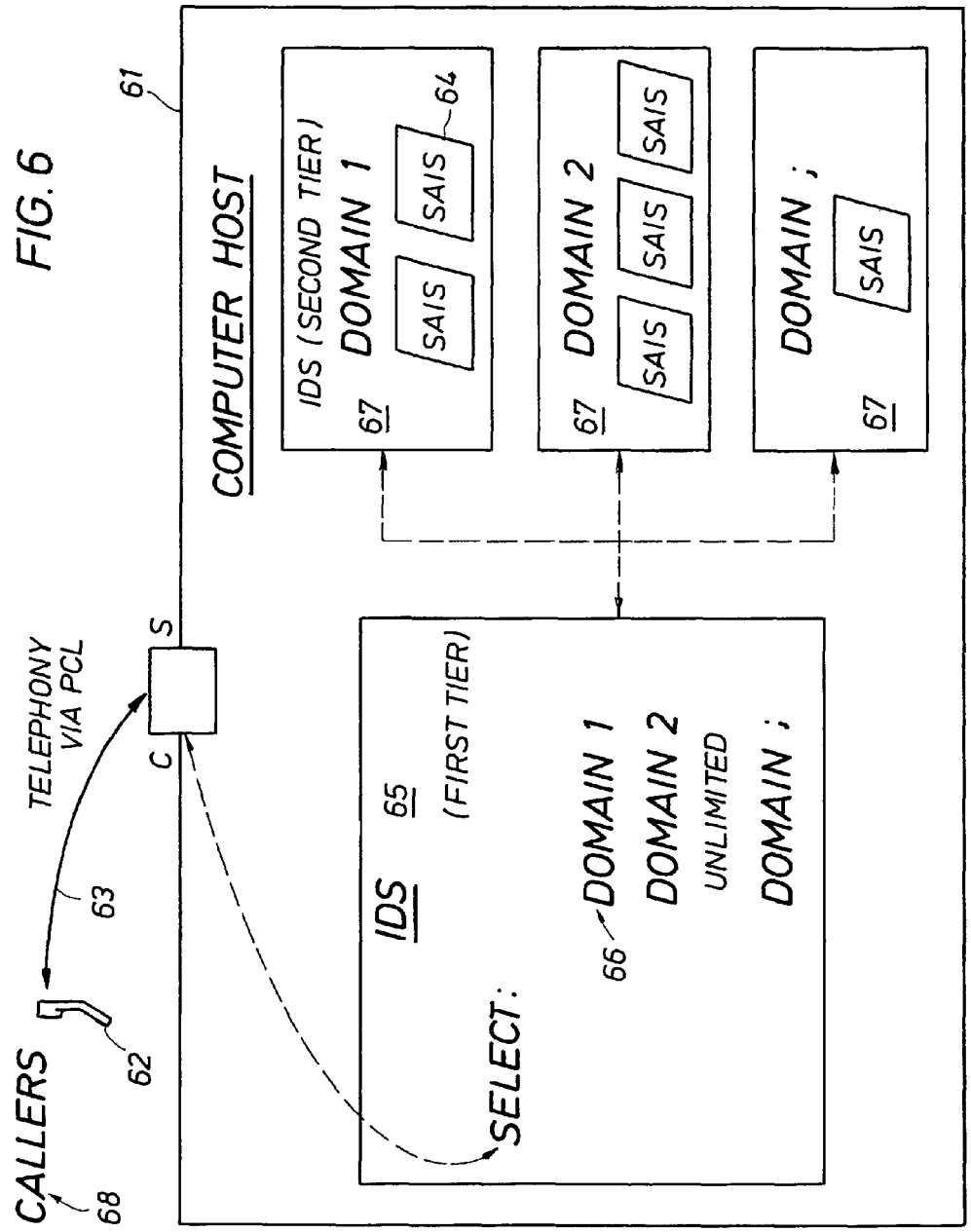
FIG. 6 is a functional block diagram for a preferred embodiment of the system illustrating caller access to audio information.

FIG. 6 illustrates general aspects of preferred embodiments of the invention. As illustrated in FIG. 6 an audio based information system in accordance with a preferred embodiment includes a computer based host 61 accessible by telephones 62 via a telephony connection over phone communication lines 63. The host computer contains an interactive directory system 65 comprised of a first tier host driven directory 66 and a second tier subscriber driven directory 67, providing navigation to indexed stored audio information segments 64 for playback to callers 68.

Navigation, as discussed more fully below, provides, typically through a series of prompts, for a caller, for responding to the prompt, to eventually reach an SAIS. Navigation options are typically provided for a subscriber to be connected immediately with an SAIS if the subscriber knows the ID or name of the SAIS in the system. In preferred embodiments of the system names are preferably provided that are suggestive of the content, analogous to web domain names.

As used herein, phone communication lines (PCL) include analog and/or digital lines used with a phone for telephony telecommunication through a Public Switch Telephone Network (PSTN) [currently using phone number routing under the North American Numbering Plan (NANP)]. A PCL serves mobile as well as fixed-line telephones. Phones should be understood to include computers which have phone functionality.

Telephony as used herein is the electronic transmission of speech or other sound, at least in part, between points, by either wire (conducting or optical) or wireless. Telephony is distinguished from telegraphy, for instance, associated with Morse Code, or the modulation scheme used in radio teletypewriter transmission (RTTY), or the facsimile transmissions of images. In addition to voice, telephony includes the use of dual-tone multi-frequency (DTMF) signals, commonly referred to as touch-tone. DTMF signals are the tones created when pressing a key on a telephone keypad and carried over the telecommunication lines in the same frequency range that is used to carry voice transmissions.

A toll-free number is a phone number for which the dialing user incurs no expense, such as current phone numbers under the North American Numbering Plan beginning with 800, 888, 877, etc. A three-digit extension is a phone number of only three-digits in length which will directly connect a dialing user to the host, similar to the current access of the numbers 911 to emergency services and 411 to directory services.

Figures 3, 3A:
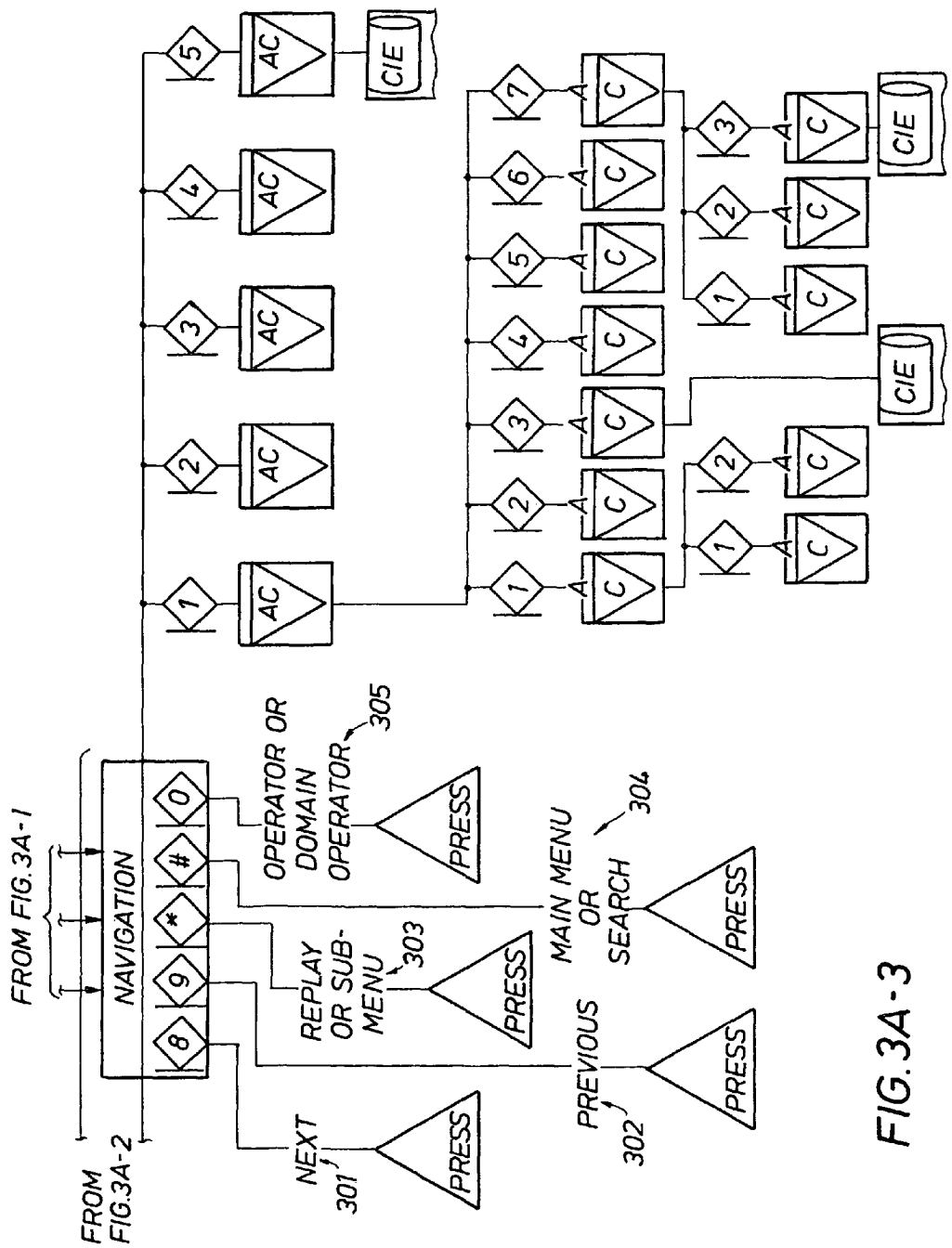
Figures 2, 4A:
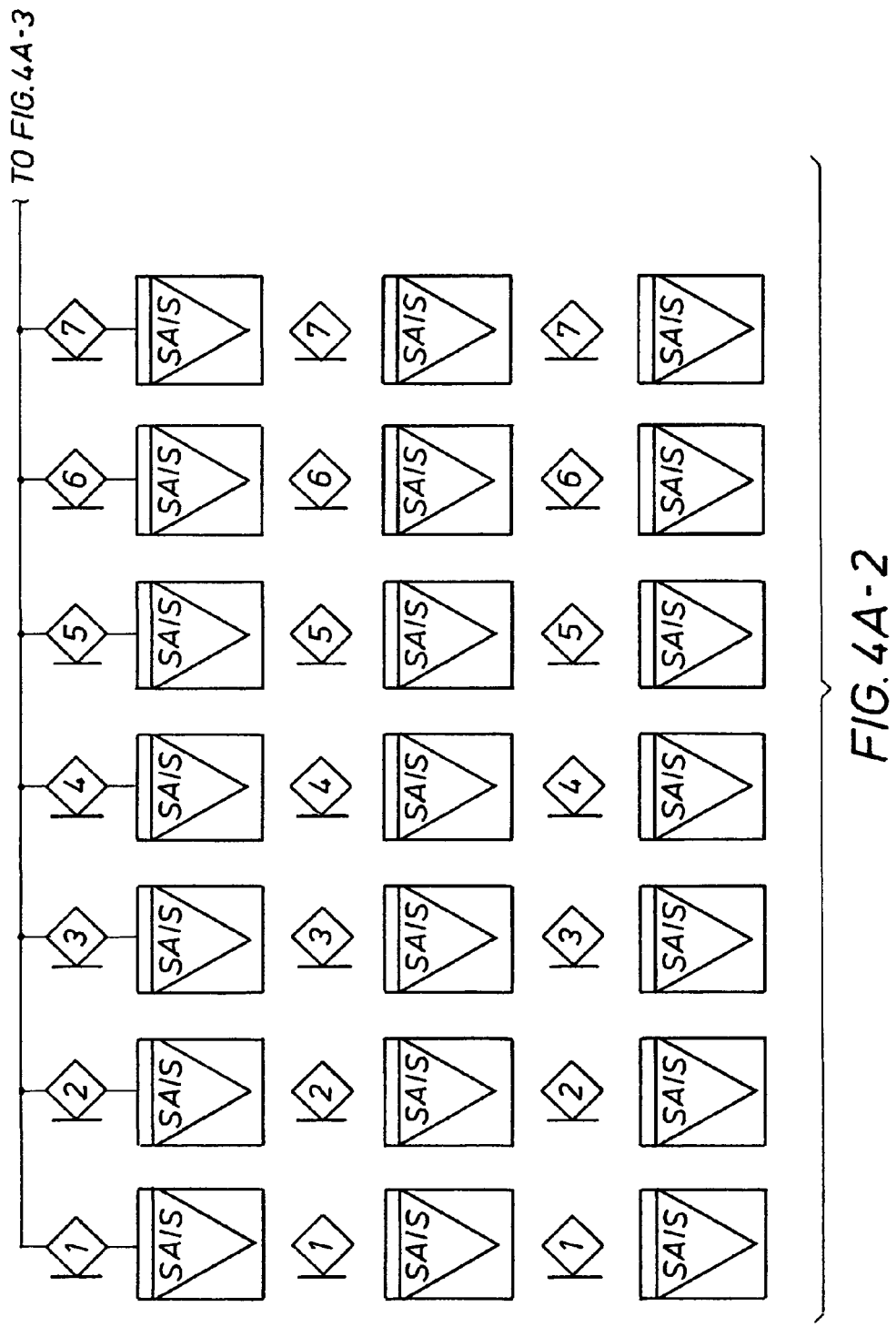
Figures 3, 4A:
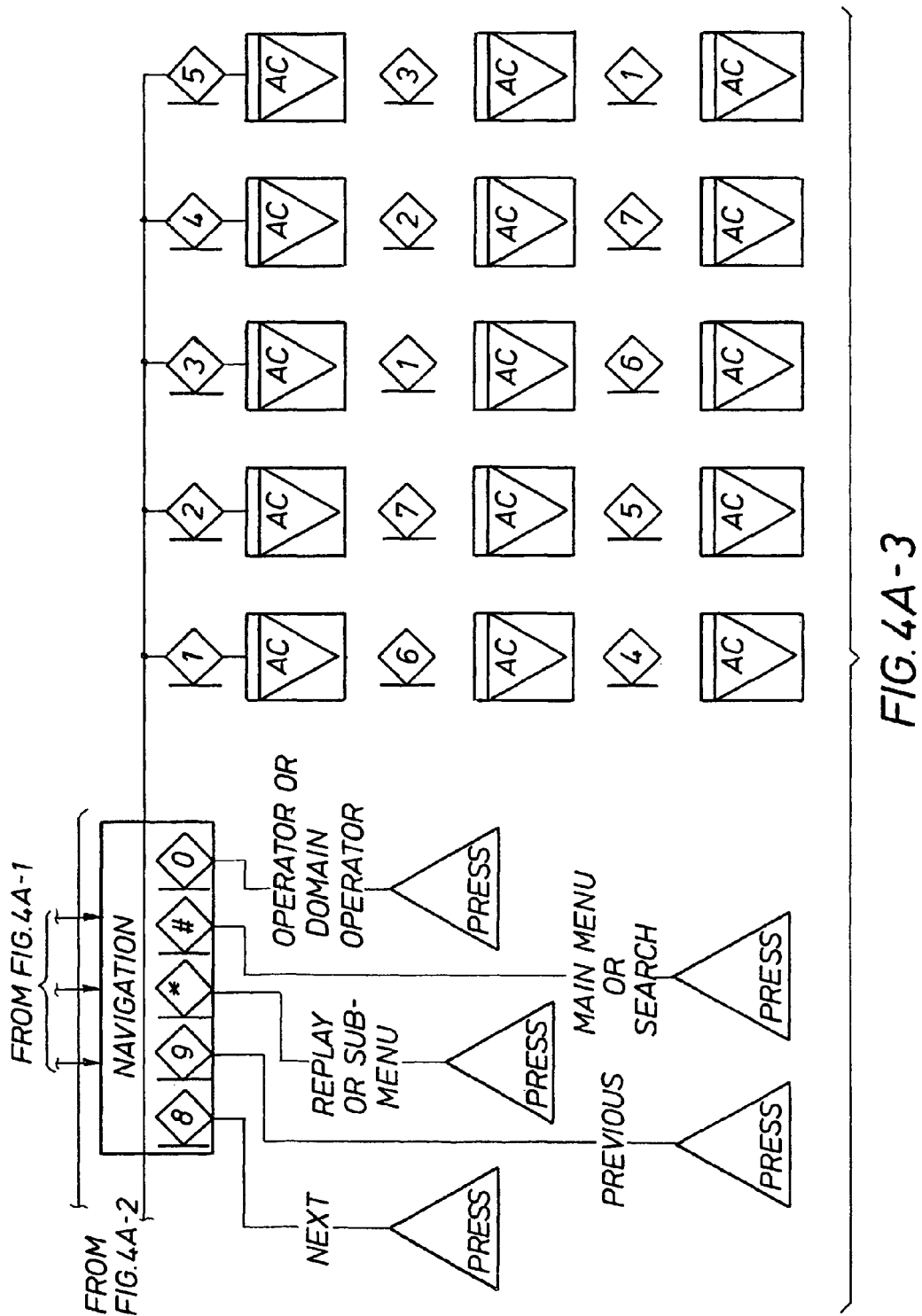

An interactive directory system (IDS) as used herein is a directory system in which a caller is able to hear a list of options and interact by supplying either voice or DTMF instructions over the phone line connection, the interaction leading to further options or to a SAIS. At some level a subscriber may have interacted to craft options. A first tier may be host driven and a second tier at least in part subscriber driven. FIG. 6 illustrates a first and second tier possibility for an IDS. FIGS. 2, 3 and 4 illustrate embodiments of navigating an IDS in greater detail.

Callers can be unregistered or registered. An Unregistered Caller has no identification, is therefore essentially anonymous, and in preferred embodiments of the instant invention will have access limited, such as to areas which do not require identification of the caller. Registered Callers will have an ID and/or a password or the like. Callers connect to the host computer via PCL using a telephone and either voice or keypad-entry of DTMF signals.

FIGS. 1-4H illustrate a preferred embodiment in greater detail. A caller 68 makes connection with a computer host 61 at Caller Connection 100. The initial response a caller hears from the host upon connecting is a prompted option to select (1) On-Demand General Public Interest 101 or (2) Main Menu 102. (In the drawings, arrows have been used to designate selectable options.)

Figure 1B:
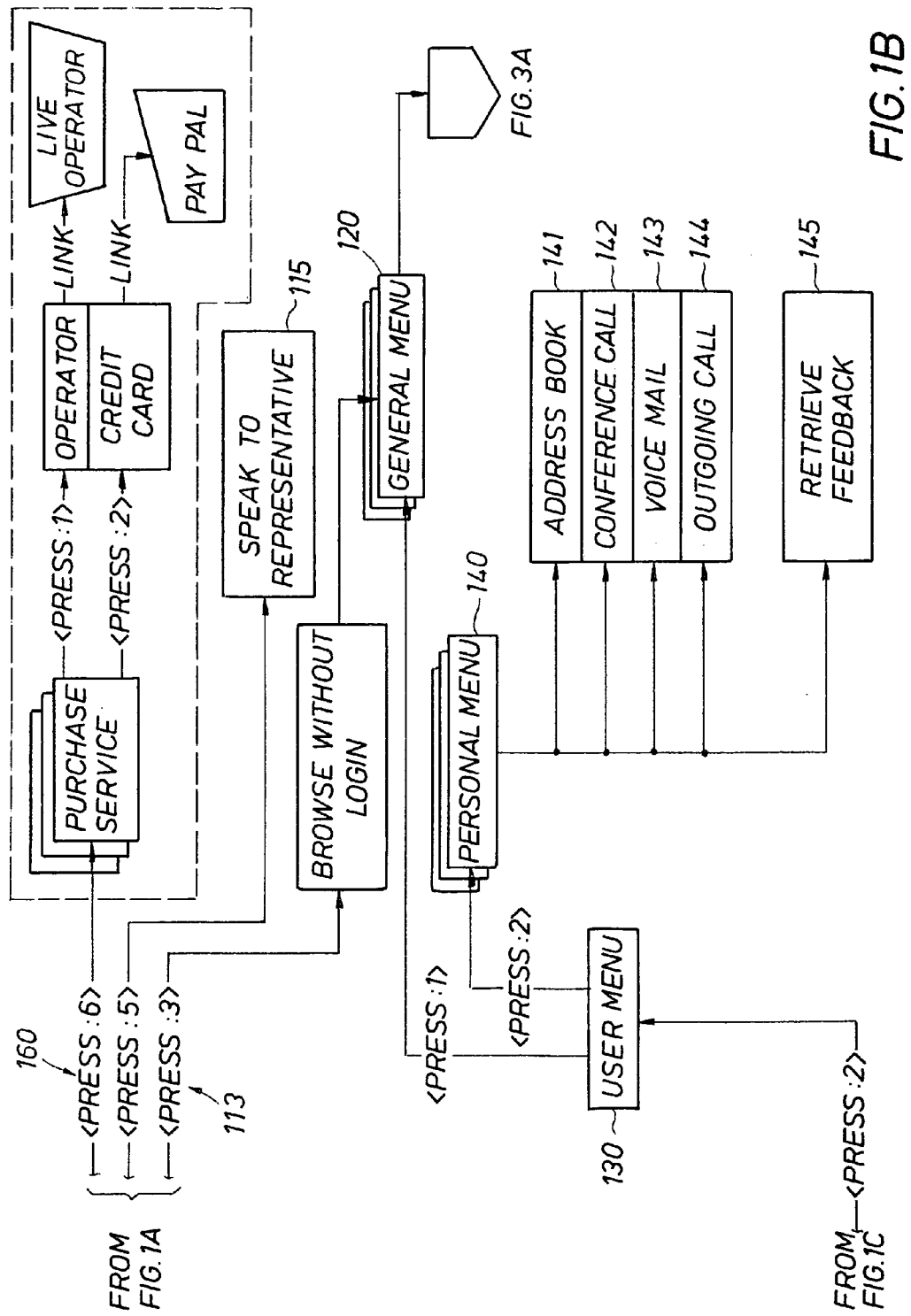
FIGS. 1-4H are application flow charts illustrating a preferred embodiment of the present invention.
Figure 1C:
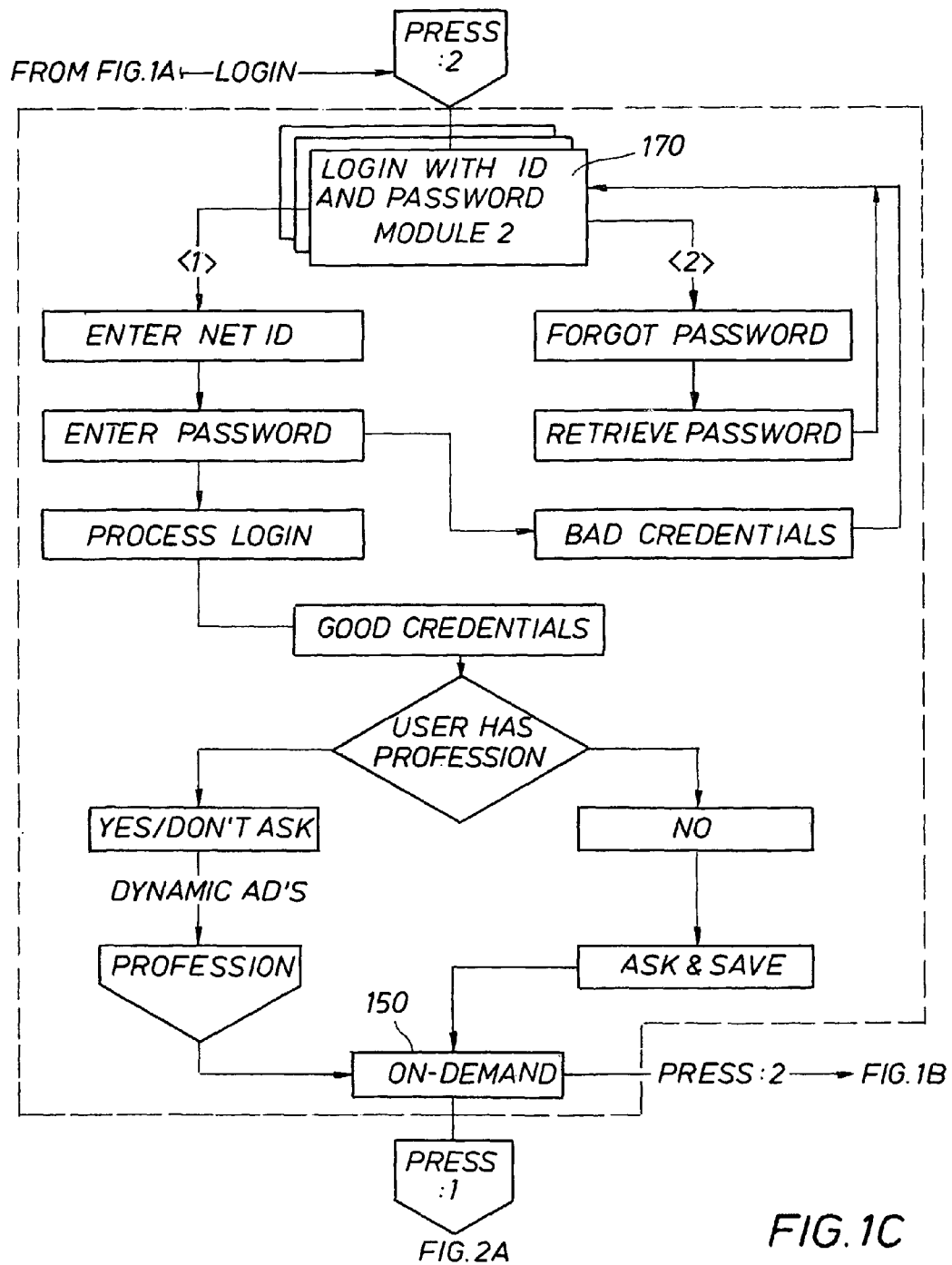
Figure 2A:
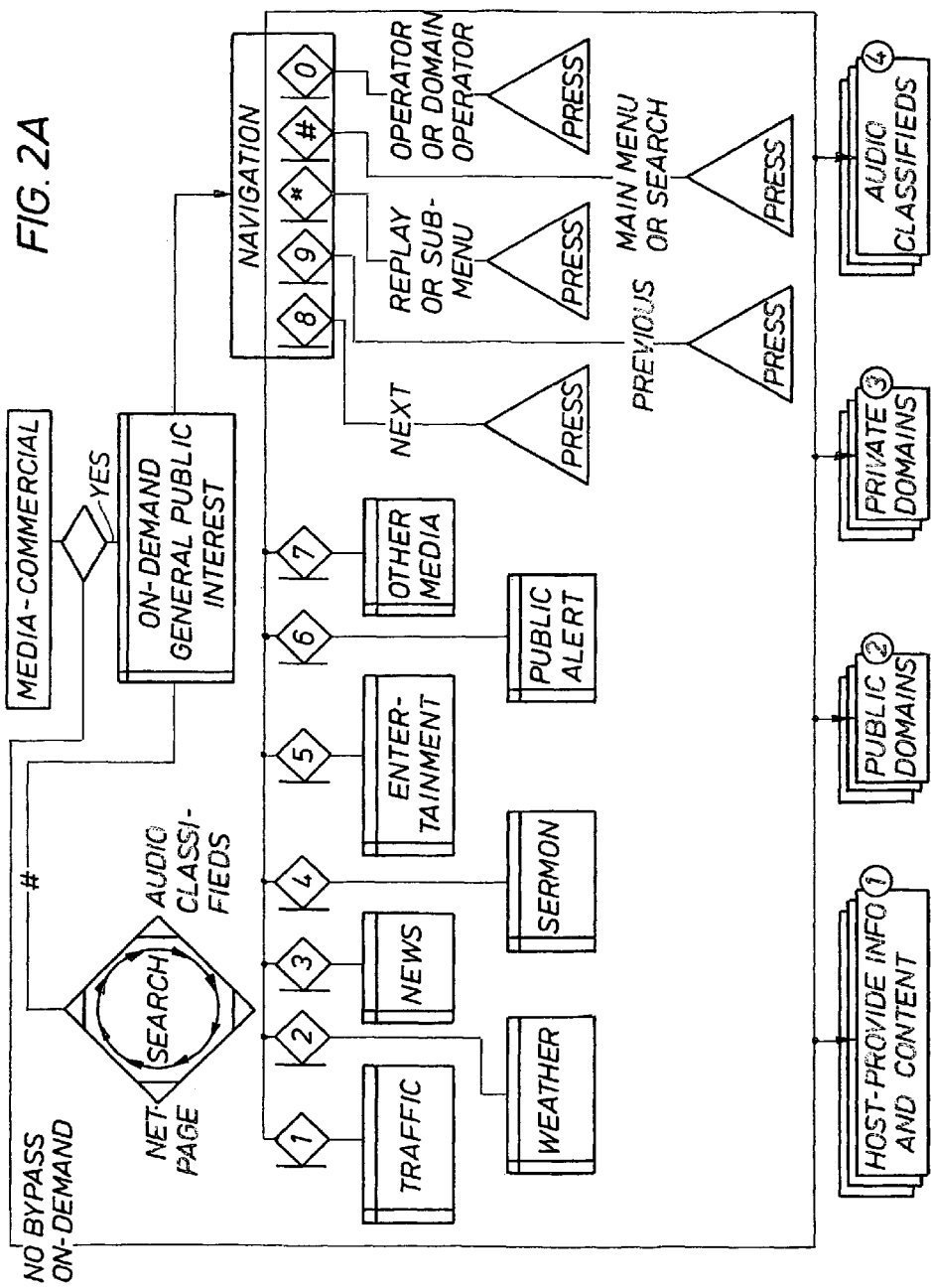
Figure 3B:
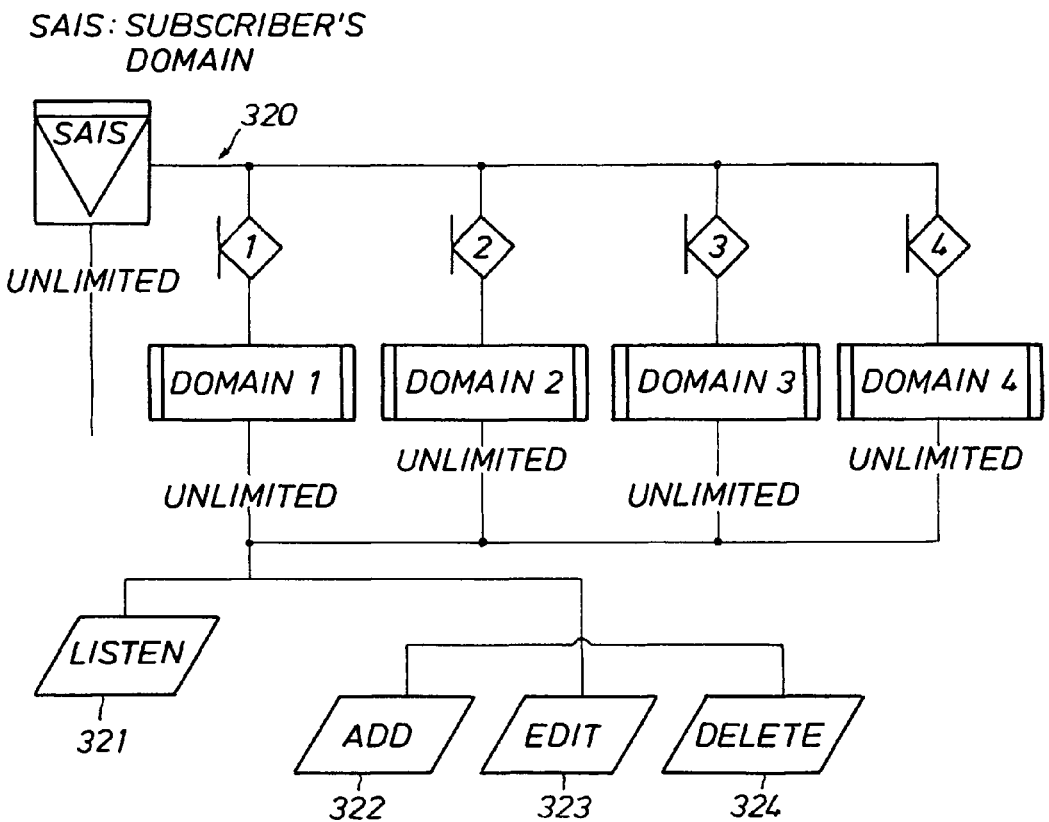
Figure 3C:
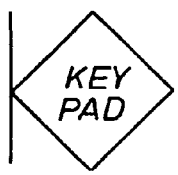
Figure 4B:
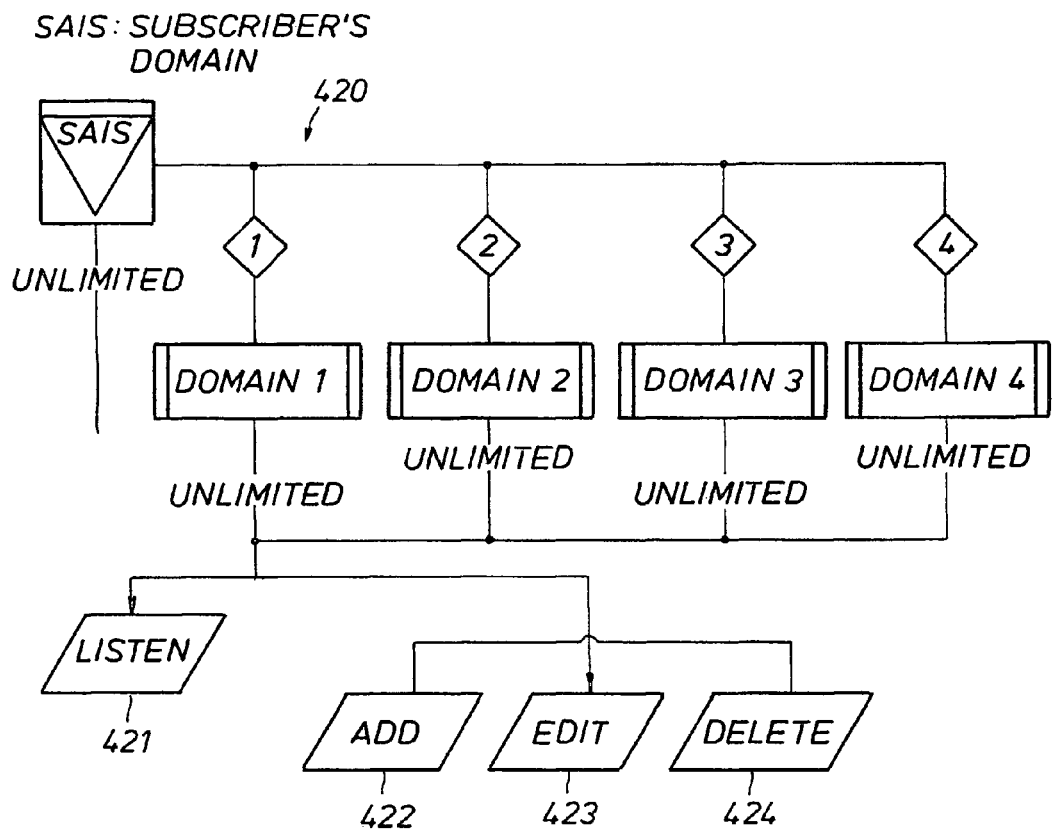
Figure 4C:

If a caller selects (2) Main Menu, by either saying "Two" or pressing the 2-key on the keypad (the drawings indicate phone keypad selection options as indicated in FIGS. 2C, 3C and 4C) of the caller's phone, the host then responds from the Main Menu 110 with options to (1) register, 111; (2) login, 112; (3) browse without login, 113; (4) manage a Net-page subscriber domain 114; (5) be connected with an representative 115; or (6) purchase services 160 (such as, for example, signing up to become a subscriber and/or providing payment information). The caller selects an option by either voice or keypad-entry of DTMF signals.

(By selecting the register option 111, the caller is taken to a registration menu 190. The host can respond with options to register with a referral number or register without a referral number. If selecting to register with a referral number, the caller can be prompted to enter a referral number. A referral number is tied to a Registered Caller and can be used by the host provider to award benefits such as reward points or discounts to Registered Callers as an incentive for signing up new Registered Callers and/or subscribers. If a caller selects to register without a referral number, the host can bypass the prompt to enter a referral number. The caller can then be prompted to enter contact information. The host stores the contact information, assigns an ID and password, and reads the ID and password to the caller. The caller is then returned to the Main Menu.)

By either selecting a login option and entering a login ID and password, or selecting the option to browse without login, the caller can reach the General Menu 120.

The caller selecting the login option 170 is prompted to enter an ID and password as assigned when the caller registered to become a Registered Caller. The ID and password are compared to valid ID/password combinations stored in a database. If the ID and password fail to verify (bad credentials), the caller is returned to login 170. If the ID and password are successfully verified (good credentials), the Registered Caller is prompted with options to proceed to On-Demand 150. Otherwise the caller goes to User Menu 130. The User Menu includes options to access the General Menu 120 or Personal Menu 140.

Note: once a caller has successfully logged in as a Registered Caller, their registration credentials remain associated with the call.

Regarding Personal Menu option 140, a Personal Menu is assigned to every Registered Caller, and preferably includes an Address Book 141, Conference Call feature 142, Voicemail 143, Outgoing Call feature 144, and a Feedback Retrieval feature 145.

An Address Book is a list of ID's of other Registered Callers and the contact information on file as provided when they registered. A Registered Caller enters the ID's of other Registered Callers to their Address Book. Within the Address Book the Registered Caller can also create and maintain distribution lists, which are sub-lists of ID's found in the Address Book, much like email distribution lists. The Address Book is then available to support the other Personal Menu features for that Registered Caller.

The Voicemail feature allows Registered Callers to leave voice messages with each other on the system.

The Outgoing Call feature allows a Registered Caller to record a message and deliver it to a list of Registered Callers or distribution list contained in his Address Book, and to schedule the time the message is to be delivered. At the appointed time, the host initiates an outbound phone call using a telephony connection over PCL to the phone number on file for the designated recipient Registered Caller(s), and plays the audio that was pre-recorded by the Registered Caller who set up the Outgoing Call.

The Feedback Retrieval feature allows a Registered Caller to hear feedback from subscribers in response to the Registered Callers activity on the given subscriber's domain.

A preferred embodiment of the Conference Call feature is illustrated more particularly on FIG. 5. Turning to FIG. 5, on the discussion of the Conference Call feature, CH stands for computerized host; CP stands for a caller phone; RCP stands for a Registered Caller on a phone; registration preferably includes by means of an ID and a password. A CP caller phone can include RCP registered caller phone. ICC indicates an interactive conference call. The identify function is by means of interactive telephony communication over communication lines using phone voice and/or keypad. Therein, preferably a computerized host (CH) provides selectable options and/or prompts to a caller phone (CP) over the phone communication line (PCL.)

Roman numeral I in the Conference Call feature indicates a registered caller phone identifying a date and time to a computerized host for an interactive conference call (ICC.) Optionally, the RCP can identify the phone list for the interactive conference call (ICCL.) Optionally further, the RCP can identify a passive listener list for the ICC (ICCPL.)

A further option of the Conference Call feature, illustrated in section II, indicates a caller phone CP that interacts with a computerized host through interactive telephony communication. The caller phone identifies a request for it to be placed on an interactive conference call list for an RC. The caller on the phone or the caller phone may otherwise have to qualify itself, if relevant in the circumstances. Based upon the requests, the computerized host maintains a list for the conference call (ICCL.)

In box III, the computerized host sets up the interactive conference call indicated by the triangle. The computerized host places the registered caller phone in communication with the phones on an established interactive conference call list such that all can communicate interactively. The host in addition can at least listen to the call in order for the host to further record the call, or at least segments of the call, in audio segment ICC. This is performed at the date and time specified.

Box IV illustrates an option where a caller phone and/or a registered caller phone and/or an interactive conference call passive list phone communicates with the computerized host and requests to listen to the recorded audio segment of the interactive conference call. The computerized host plays the recorded audio segment of the interactive conference call to the caller, any prerequisites having been established. Preferably means for forwarding and reversing the audio segment are provided.

The option illustrated in V is where the computerized host permits a caller phone and/or a registered caller phone and/or a phone from an interactive communication passive list to call in and record segments, indicated as audio content AC, into and onto the recorded audio segment of the interactive conference call. Thereafter callers requesting to listen to the recorded audio segment of the interactive conference call will hear the additional comments added, as permitted by any prerequisites, to the recorded segment by the computerized host.

Returning to FIG. 3, the General Menu is illustrated in FIG. 3. The General Menu provides options for accessing various categories of stored audio content, including information and content provided by the host (host domains) 31, public subscriber domains (public domains) 32 with information and content substantially provided by subscriber, private subscriber domains accessible via subscriber-provided passwords (private domains) 33, and audio classifieds 34. The General Menu also provides an option to search 35 for a domain or an audio classified item directly by a Domain #, Domain Name, Item #, or Zip Code where Item is located. See FIGS. 2C, 3F, and again at 4F.

In one embodiment, one method of searching is by the well-recognized refined search, whereby a user enters key words to search, receives a number of entries meeting the criteria, and refines the search by amending the search criteria.

The host domains, public domains, audio classifieds, and option to search are available to both registered and unregistered callers. Private domains require a password, assigned specifically to each private domain and provided to the caller by the subscriber that is responsible for the domain.

A domain is an area in the host system assigned to a content provider, such as a host or a subscriber. Some elements of the directory structure and content within the domain may be created, defined, supplied, and edited by the subscriber.

Host-driven means that the structure and content are created, defined, supplied, and edited by the host. Subscriber-driven means that the structure and content are created, defined, supplied, and edited, at least in part, by a subscriber.

By selecting the host domains, public domains, or private domains at the general menu, the caller reaches a navigation page 36 for the selected option. At the navigation page, the caller hears a list of available domains 37 from which to select (up to seven are available in the preferred embodiment), followed by options to select a next list 301, a prior list 302, re-play the current list 303, return to the main menu 304, or be connected to an operator 305. Once the caller selects a given domain they have access to the directory structure defined by the party responsible for managing that domain, and navigable in the same manner as the navigation page described above. The directory structure is used by callers to navigate to and select stored audio information segments, and may consist of a hierarchical tree of directories and subdirectories. Examples of various directory structures are illustrated at 311-316. In the case of the host domains, the host is responsible for managing the directory structure.

A stored audio information segment (SAIS) means stored data suitable for telephony communication having content in addition to music (if any). Once a SAIS is selected by the caller it is played by the host computer to the caller over the telephony PCL connection. Segment identification is either voice instruction or DTMF.

Skipping to FIG. 7, FIG. 7 illustrates a system for managing audio content supplied by multiple independent subscribers 71 72 in accordance with the preferred embodiment which includes a host computer 75 accessible by telephone 73 via a telephony connection over phone communication lines 74, supporting navigable subscriber domains 78 and the stored audio information segments 77 supplied by phone via PCL telephony connection by the subscribers, by internet or otherwise.

As used herein, subscribers include both contract subscribers 72 and non-contract subscribers 71. A contract subscriber is an information provider of the system who has contracted, for a fee, for access to and means to provide content within an assigned domain. A non-contract subscriber may provide information to the system but without contract or fee.

The directory structure of a subscriber's domain is defined by the subscriber and configured by the administrator of the system based upon the subscriber's instruction. The subscriber's instructions can be communicated either by oral or written instruction given to support staff of the system, or via a web form that is created and published on the system provider's web site for such purpose.

Once the domain directory structure is configured for the subscriber by a system administrator, the subscriber connects to the host computer via PCL using a telephone and either voice or keypad-entry of DTMF signals, reaching the same Main Menu 110 shown in FIG. I which callers access.

The subscriber selects the login option 112, and is prompted to enter an ID and password. If the subscriber ID and password are verified, the subscriber navigates to the General Menu as described above for a Registered Caller. Either by navigating through the public/private domain options of the General Menu, or by selecting the search option and entering the appropriate domain name or ID, the subscriber accesses the subscriber's domain. When a subscriber selects a SAIS in their subscriber domain, as illustrated in FIGS. 3B, 4B, the subscriber hears options to Add 322 422, Edit 323 423, Delete 324 424 or Listen 321 421.

If Add is selected, the host prompts the subscriber to record over the telephony connection a SAIS, followed by a prompt to record segment identification. Segment identification is the description for a SAIS that a caller will hear during navigation.

If Edit is selected, the host prompts the subscriber to record additional content which will be appended to the SAIS.

If Delete is selected, the SAIS and corresponding segment identification will be deleted.

Selecting Listen will play the SAIS audio stream for the subscriber.

Figure 3D:
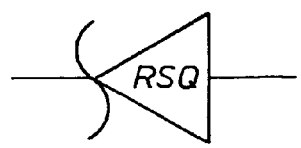
Figure 3E:
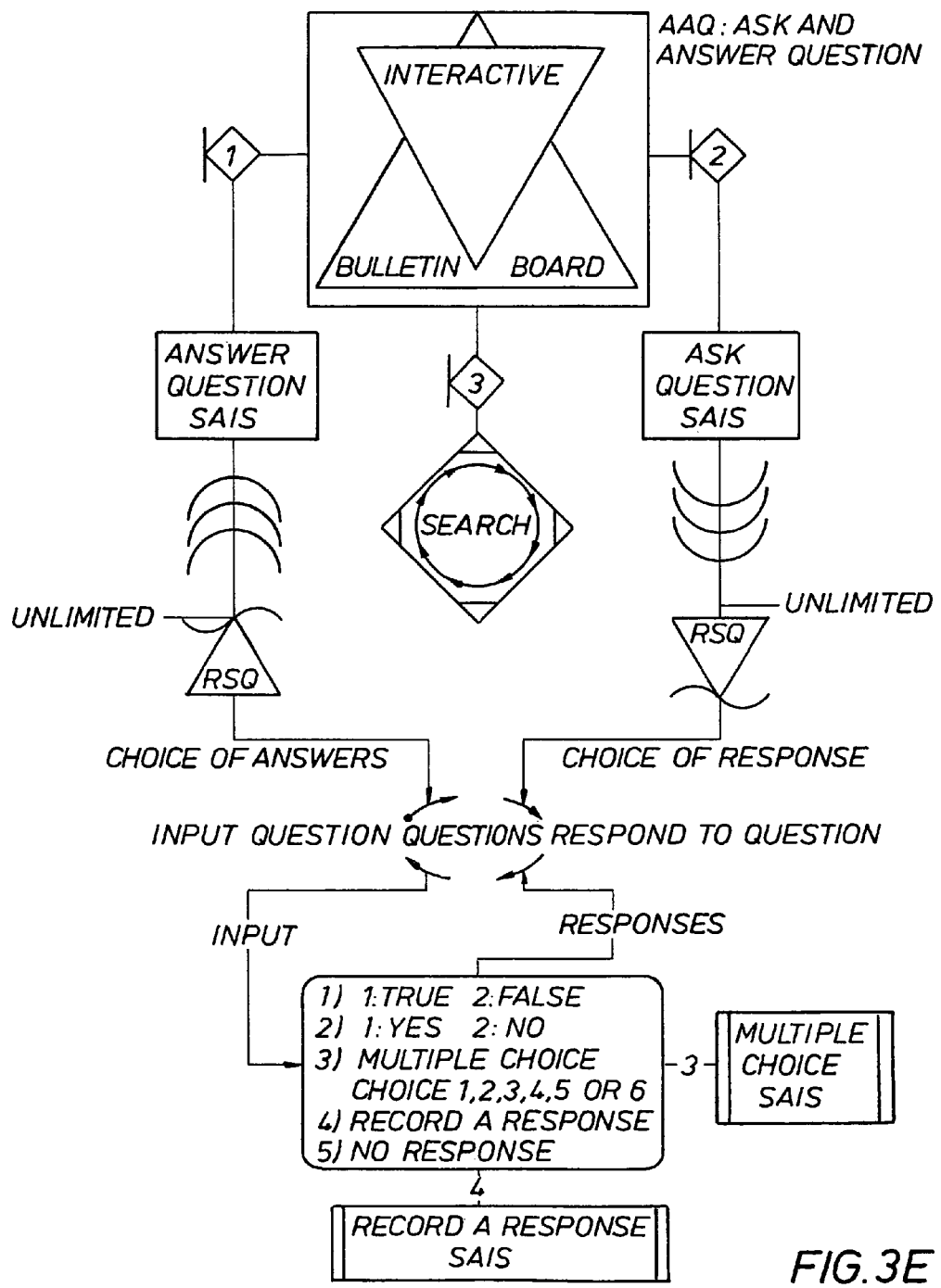
Figure 4D:
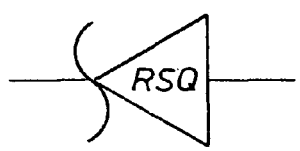
Figure 4E:
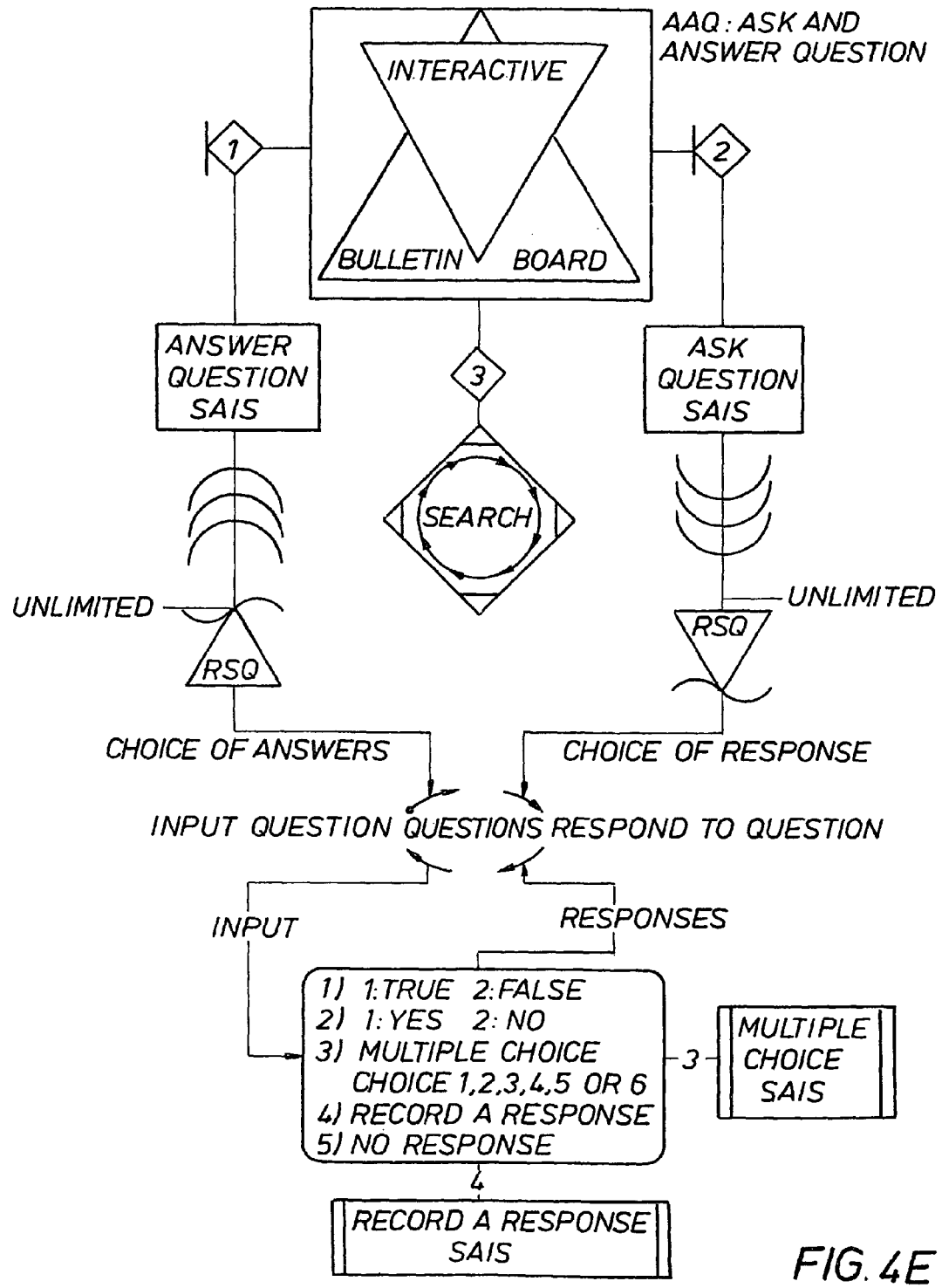

Another aspect of the invention is the Ask/Answer feature, illustrated in FIGS. 3E, 4E, which is the ability for a subscriber to pose a question to the caller via the SAIS content and allow the caller to respond. After recording a SAIS, the subscriber is asked whether the SAIS a) requires no response, b) can be answered in a True/False format, c) a Yes/No format, d) a multiple choice format, or e) allow the caller to record an audio response.

Selecting a) results in the SAIS being a listen-only audio segment, this provides no option for the caller to respond. "Requires no response" is also the default selection in the event the subscriber fails to make a selection.

When either b) or c) is selected by the subscriber, the host adds the corresponding affirmative (True or Yes) and negative (False or No) responses as options for a caller to select at the conclusion of playing the SAIS.

When d) is selected, the subscriber is then prompted to select the number of choices that the subscriber desires the caller to choose among, for example 1, 2 3 4 5 or 6. Once the caller selects the number of desired choices, the host then prompts the subscriber to record an SAIS for each of the number of choices selected. For example if the subscriber selects 3 choices, the host will prompt the subscriber to record an SAIS corresponding to answer 1, followed by recording an SAIS for answer 2, and then followed by recording an SAIS for answer 3. When a caller selects an SAIS that has been set up as multiple choice by the subscriber, at the conclusion of playback of the SAIS, the caller hears the three answer-associated SAIS and is prompted to select one as the caller's response.

When e) is selected by the subscriber, the host provides the caller with an option to leave a SAIS response.

When the Ask/Answer feature is selected for a SAIS (indicated in the drawings as REQ Respond to Question as indicated in FIGS. 3D and 4D), the host stores and tracks caller responses as they occur. In the case of the True/False, Yes/No or multiple choice options, the subscriber can call in and hear the host report the number of callers that have selected each response. When retrieving the collected responses from the host, the subscriber is also given an option to reset the counters for the response options of that particular SAIS to zero.

Returning to FIG. 1, the Main Menu 110 can provide an alternate means for a subscriber to manage the content within the subscriber's domain, by selecting the Manage Net-page option 114.

FIG. 4 illustrates many of the content management features of a preferred embodiment of the invention that may be available to a subscriber who selects to go directly to Manage Net-page by choosing that option directly from the Main Menu. These features may be available whenever a subscriber reaches that subscriber's domain, and are discussed elsewhere in the description in more detail.

Audio Classifieds are domains containing SAIS offering items for sale. Each audio classified item receives an Item ID. Audio Classifieds are reached from the General Menu and may be accessed through a Navigation page or by the search option using the Item ID.

When selecting the Audio Classified option under the General Menu, the caller is given the options to Buy, Sell and Retrieve 341.

Selecting Buy takes a caller to a navigation page to browse the items for sale by category or zip code. After navigating to and listening to the SAIS of an audio classified item, the caller will be given an option to hear the seller's contact information, referred to as a Contact Information Exchange 3H 4H.

Selecting Sell is an option that requires a Registered Caller to be logged in, at which point the Registered Caller is prompted to record audio for the Description of the Item, Price of the Item, Seller's Name, Seller's Phone Number, and Zip Code where the item is located 361. The process of creating audio classified items is illustrated in FIGS. 3G, 3H, 4G, 4H.

The Retrieve option allows a Registered Caller who has posted items to retrieve a count 342 of the number of callers who have requested the CIE for an audio classified item posted by the Register Caller. CIE is only available for Registered Callers who have paid an additional fee.

FIG. 2 illustrates the features available under the General Public Interest Menu. This menu may be selected either at the Caller Connection prompt 100 encountered when the call is first connected, or following the successful verification of ID and password provided during login FIG. 1, 150. If the caller accesses the General Public Interest Menu at the Caller Connection, and thus without logging in, the Unregistered Caller will have access to navigate, select, and listen only. Navigation is accomplished via a navigation page as discussed above and as illustrated in FIG. 2. The content available for selection is intended to be content of wide public interest, including for example, traffic, weather, news, sermons, entertainment, and public alerts. Options to select host domains, public domains, private domains, and audio classifieds are also available at the General Public Interest Menu.

A subscriber, who is the content provider for a domain within the general public interest area, supplies and manages content by the same means as described above for subscribers supplying and managing the content of their domains. In order to receive the options to Add, Edit, Delete or Listen FIG. 2D, the subscriber must access the General Public Interest Menu after logging into the system via the login procedure of FIG. 1, 150.

In a web-sourcing and On Demand Service alternative, some content can be secured by the host itself, such as securing audio streaming from web sites. This can be particularly useful for securing live news, entertainment, sermons, even a "book-on-tape".

A web audio content securing module could be programmed via a database to periodically secure audio streaming from specified web sites at specified time intervals. For instance a buffer in memory could retain 1 hour's worth of live news, 2 hours' worth of jazz programming, or 3 hours' worth of sports events.

Incoming callers would be connected to the live portion of the memory buffer, but would have the option of starting at the beginning or oldest segment of the memory buffer.

More particularly, one preferred embodiment of accessing, capturing, and storing audio content is from web sites which contain embedded streaming audio accessible through an internet connection. Such web sites can be one source for efficiently providing general public interest content from subscribers, such as weather, news, traffic, entertainment, or inspirational speeches, e.g. of religious or political interest, as would be available in the General Public Interest Menu. Other embodiments may include broadcast television or radio signals as sources of streaming audio.

Based upon a schedule maintained at the host related to a streaming audio source, a host can connect to a specified web site that contains embedded streaming audio through an internet connection and begins receiving the audio played at that site. For each site accessed, the system can maintain "record time settings" indicating the frequency that the audio link should be accessed (e.g. daily, weekly, monthly), which day of the week or month to begin recording (if other than daily), what time of day to start recording, and the length of time which should be recorded per SAIS. The system can contain a global length of time setting, e.g. 3 minutes per SAIS, which can be used when a length of time setting is not otherwise specified for the particular domain content being recorded. A system dialogue box can be used by a host operator to input the settings for a given audio link to be accessed.

Based on the record time settings, the computer host can capture the audio segments in a record buffer and index each segment by name, time, and date. For example the content for an on demand news domain could be recorded in 20 three-minute segments every hour. In order to save space the segments could be recorded in a loop, such that upon completion of recording the final segment (i.e. the $20^{th}$ segment of the hour in this example) the first segment of the following hour can be recorded over the first segment of the prior hour, and each subsequent segment in turn can be recorded over its corresponding segment from the previous hour.

When a caller accesses the domain of one of these streaming audio segments, either through navigation or direct entry of the domain name as previously described, the incoming call can be connected based upon the time of entry of that call to the beginning of the segment which is then currently being recorded. At the end of each segment the caller can hear navigation options which can include options to hear the previous segment, continue to the next segment, search for additional content, record the caller's comments related to the segment just completed, and hear comments left by other callers related to the just completed audio segment.

This same method of storing audio in sequentially timed segments may also be employed by the system with regard to the conference call features described above and in FIG. 5. As the conference call is being recorded by the host in audio segment interactive conference call, the host can store the audio in sequentially time segments, e.g. 3-minute segments, and can include the start time of each audio segment in the index for that segment. When a caller phone and/or registered caller phone is connected to the interactive conference call, the caller phone and/or registered caller phone can be connected to the beginning of the audio segment of the interactive conference call that is then currently being recorded. Navigation options as referenced above can give the caller the option to hear the previously recorded audio segments for the interactive conference call.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. An audio information system, using phone communication lines (PCL), the system characterized by offering extensive information to anyone with a telephone and access to a public PCL (unregistered caller,) the information selected and stored on a host by independent and unrelated content providers distinct from the host (subscribers), the system comprising:

a computer based host of the system accessible to phones for telephony communication through a public PCL connection independently of Internet Service Providers (ISP's);

the host supporting multiple indexed stored audio information segments (SAIS) available for playback to multiple unregistered callers;

content of the segments substantially selected and supplied and stored by multiple independent subscribers, wherein the segments contain information related to at least one of consumer items for sale, general public interest content, entity information, and educational content; and a host supported interactive directory system (IDS), the directory system providing for connecting an unregistered caller's phone through a PCL connection with an audio segment stored by a subscriber, in accordance with segment identification supplied over said phone line connection, for at least audio segment playback to the caller phone, the caller phone unrelated to the subscriber.

2. The system of claim 1 wherein the segments contain information related to at least two of consumer items for sale, general public interest content, entity information, and educational content.

3. The system of claim 1 including the host supporting some information available for playback only to registered callers.

4. The system of claim 1 wherein segment content is supplied by a subscriber from a phone by telephony through a PCL connection.

5. The system of claim 1 wherein the telephony communication through a PCL connection is through a toll-free number and/or a three-digit extension.

6. The system of claim 1 wherein segment identification is supplied from a phone by telephony through a PCL connection using a phone keypad.

7. The system of claim 1 wherein the host supports a plurality of domains, at least some domains controlled by subscribers, and the plurality of domains includes at least one of a general public information domain, a public subscriber domain, a private subscriber domain, and an audio classified domain.

8. The system of claim 7 wherein the host supports a general public information domain that includes audio segments related to at least one of weather, news, and traffic.

9. The system of claim 8 wherein the general public information domains includes audio segments related to at least one of sermons, entertainment, and public alerts.

10. The system of claim 1 wherein the interactive directory system includes two tiers, including a first tier host driven directory system and a second tier at least in part subscriber driven directory system.

11. The system of claim 10 wherein the second tier subscriber driven directory system is a function of information supplied by a subscriber.

12. A method for providing an audio information system offering extensive information to anyone with a telephone and access to a public phone communication line (unregistered caller), the information selected and stored on a host by independent and unrelated content providers distinct from the host (subscribers), the method comprising:

providing a computer based host for the audio information system accessible to phones through a public telephony PCL connection independently of Internet Service Providers (ISP's);

supporting multiple indexed stored audio information segments (SAIS) on said host available for playback to multiple unregistered callers, wherein segment content is substantially selected and supplied and stored by multiple independent subscribers, the segments containing information related to at least one of consumer items for sale, general public interest content, entity information, and educational content; and supporting an interactive directory system, the directory system providing for connecting an unregistered caller's phone through a phone communication line (PCL) connection with an audio segment stored by a subscriber in accordance with segment identification supplied over said phone line connection, for at least audio segment playback to the caller phone, the caller phone unrelated to the subscriber.

13. The method of claim 12 wherein the segments contain information related to at least two of consumer items for sale, general public interest content, entity information, and educational content.

14. The method of claim 12 including the host supporting some information available for playback only to registered callers.

15. The method of claim 12 including selecting segment content by supplying segment identification over a PCL connection using a phone key pad.

16. The method of claim 12 including effecting the telephony PCL connection through a toll-free number and/or a three-digit extension.

17. The method of claim 12 wherein segment identification is supplied from a phone by telephony through a PCL connection using a phone keypad.

18. The method of claim 12 wherein the host supports a plurality of domains, at least some domains controlled by subscribers, and the plurality includes at least one of a general public information domain, a public subscriber domain, a private subscriber domain, and an audio classified domain.

19. The method of claim 18 wherein the host supports a general public information domain that includes audio segments related to at least one of weather, news, and traffic.

20. The method of claim 19 wherein the general public information domains includes audio segments related to at least one of sermons, entertainment, and public alerts.

21. The method of claim 12 including providing the interactive directory system with two tiers, including a first tier host driven directory system and a second tier subscriber driven directory system.

22. The method of claim 21 wherein the second tier subscriber driven directory system is a function of information supplied by a subscriber.

23. A method for managing, by a host computer, audio content as supplied by multiple independent unrelated content providers distinct from the host (subscribers,) offering extensive audio communication to anyone with a telephone and access to a phone communication line (unregistered caller), the information selected and stored on the host by subscribers, the method comprising:
  providing the computer based host accessible to unregistered callers' phones by public telephony phone communication line (PCL) connection independently of Internet Service Providers (ISP's);
  enabling subscribers to supply audio content for stored segments via said PCL connection, wherein the segments contain information related to at least one of consumer items for sale, general public interest content, entity information, and educational content;
  indexing the stored segments; and
  connecting a caller phone to a segment in accordance with caller supplied segment identification.

24. The method of claim 23 including the PCL Connection using a toll-free number and/or three-digit extension.

25. The method of claim 23 including providing the stored audio segments interactive functionality wherein the interactive functionality enables at least once recording a caller response.

26. The method of claim 25 including storing and indexing the caller response and enabling playback to a plurality of subsequent callers.

27. A system for managing, by a host computer, audio content supplied by multiple independent subscribers, the system offering extensive information to anyone with a telephone and access to a public phone communication line (unregistered caller), the information selected and stored on a host by independent and unrelated content providers distinct from the host (subscribers,) the system comprising:
  the computer based host accessible by phone through a public phone communication line (PCL) connection independently of Internet Service Providers (ISP's);
  the host supporting navigable subscriber domains-accessible by unregistered callers of the system, wherein the domains contain stored audio content segments, the segments containing information selected by the subscribers and related to at least one of consumer items for sale, general public interest content, entity information, and educational content; and
  the stored audio content segments supplied by phone via a telephony PCL connection by the subscribers.

28. The system of claim 27 wherein the telephony PCL connection is through a toll-free number and/or a three-digit extension.

29. The system of claim 27 including the host providing the stored audio segments interactive functionality wherein the interactive functionality enables at least once recording a caller response.

30. The system of claim 29 including the host storing and indexing the caller response and enabling playback to a plurality of subsequent callers.

* * * * *